US012692807B2

(12) United States Patent
Burmester et al.

(10) Patent No.: US 12,692,807 B2
(45) Date of Patent: **\*Jul. 28, 2026**

(54) TREATMENT OF PARTICULATE FILTERS

(71) Applicant: Johnson Matthey Public Limited Company, London (GB)

(72) Inventors: Sabina Burmester, Royston (GB); Thomas Hotchkiss, Royston (GB); David Marvell, Royston (GB); John Turner, Royston (GB)

(73) Assignee: Johnson Matthey Public Limited Company, London (GB)

( \* ) Notice: Subject to any disclaimer, the term of this patent is extended or adjusted under 35 U.S.C. 154(b) by 1408 days.

This patent is subject to a terminal disclaimer.

(21) Appl. No.: 16/947,723

(22) Filed: Aug. 13, 2020

(65) Prior Publication Data

US 2021/0047952 A1 Feb. 18, 2021

(30) Foreign Application Priority Data

Aug. 15, 2019 (GB) ...................................... 1911704

(51) Int. Cl.
F01N 3/029 (2006.01)
C04B 41/00 (2006.01)
(Continued)

(52) U.S. Cl.
CPC .......... F01N 3/0293 (2013.01); C04B 41/009 (2013.01); C04B 41/4515 (2013.01);
(Continued)

(58) Field of Classification Search
CPC .............. C04B 41/009; C04B 41/4545; C04B 41/4515; C04B 41/85; C04B 41/47;
(Continued)

(56) References Cited

U.S. PATENT DOCUMENTS 4,990,371 A 2/1991 Dutta
5,505,763 A 4/1996 Reighard et al.
(Continued)

FOREIGN PATENT DOCUMENTS

CN 201158550 Y 12/2008
CN 101970088 A 2/2011
(Continued)

OTHER PUBLICATIONS

Liu et al., Using Artificial Ash to Improve GPF Performance at Zero Mileage, SAI Technical Paper, Apr. 2, 2019, 7 pages.

*Primary Examiner* — Katherine A Bareford
(74) *Attorney, Agent, or Firm* — BakerHostetler

(57) ABSTRACT

A method and apparatus (1) for treating a filter (2) for filtering particulate matter from exhaust gas. A reservoir (3) containing a dry powder (4) is provided. A vacuum generator (6) establishes a primary gas flow through a porous structure of the filter (2) by applying a pressure reduction to an outlet face of the filter (2). A spray device (7) receives the dry powder (4) from a transport device (8) and sprays the dry powder (4) towards the inlet face of the filter (2). A controller (9) is configured to control operation of at least the vacuum generator (6) and the spray device (7).

13 Claims, 4 Drawing Sheets

(51) Int. Cl.
      *C04B 41/45*       (2006.01)
      *F01N 9/00*        (2006.01)
      *C04B 111/00*      (2006.01)

(52) U.S. Cl.
      CPC .......... *C04B 41/4545* (2013.01); *F01N 9/002*
            (2013.01); *C04B 2111/00793* (2013.01)

(58) Field of Classification Search
      CPC ... C04B 35/478; C04B 35/195; C04B 35/565;
            C04B 38/0006; C04B 14/303; C04B
            14/064; C04B 14/047; C04B 2111/00793;
            F01N 3/0222; F01N 3/0293; F01N 3/021;
                        F01N 3/0237; F01N 9/002
      See application file for complete search history.

(56)                References Cited

U.S. PATENT DOCUMENTS

| | | | |
|---|---|---|---|
| 8,889,221 B2 | 11/2014 | Sappok et al. | |
| 9,347,354 B2 | 5/2016 | Pfeifer et al. | |
| 9,687,785 B2 | 6/2017 | Chen et al. | |
| 9,708,946 B2 | 7/2017 | Daido et al. | |
| 10,258,978 B2 | 4/2019 | Wolff et al. | |
| 10,287,938 B2 | 5/2019 | Warner et al. | |
| 12,357,981 B2* | 7/2025 | Burmester | B01J 37/038 |
| 2004/0161596 A1 | 8/2004 | Taoka et al. | |
| 2004/0176246 A1 | 9/2004 | Shirk et al. | |
| 2005/0161158 A1* | 7/2005 | Schumacher | C23C 16/4412 |
| | | | 156/345.29 |
| 2008/0025882 A1 | 1/2008 | Tsuji et al. | |
| 2010/0011726 A1 | 1/2010 | Ishikawa | |
| 2010/0266461 A1 | 10/2010 | Sappok et al. | |
| 2011/0091361 A1 | 4/2011 | Reinsch | |
| 2011/0229634 A1* | 9/2011 | Tsuji | C04B 41/87 |
| | | | 427/181 |
| 2011/0229635 A1 | 9/2011 | Tsuji et al. | |
| 2013/0149440 A1 | 6/2013 | Pyzik et al. | |
| 2013/0260029 A1 | 10/2013 | Tsuji et al. | |
| 2015/0059321 A1 | 3/2015 | Nakayama et al. | |

| | | | |
|---|---|---|---|
| 2016/0115835 A1 | 4/2016 | Daido et al. | |
| 2019/0048771 A1 | 2/2019 | Liu et al. | |
| 2019/0111445 A1 | 4/2019 | Lutz et al. | |
| 2021/0236976 A1* | 8/2021 | Foerster | B01D 46/00 |
| 2021/0260573 A1* | 8/2021 | Hotchkiss | F01N 3/035 |
| 2022/0258150 A1* | 8/2022 | Burmester | B01J 37/0217 |
| 2022/0258201 A1* | 8/2022 | Burmester | B01D 39/2041 |

FOREIGN PATENT DOCUMENTS

| | | |
|---|---|---|
| CN | 102188857 A | 9/2011 |
| CN | 110121625 A | 8/2019 |
| DE | 4225970 C1 | 4/1994 |
| EP | 1775022 A1 | 4/2007 |
| EP | 1985352 A2 | 10/2008 |
| EP | 2105199 A1 | 9/2009 |
| EP | 2158956 A1 | 3/2010 |
| EP | 2168662 A1 | 3/2010 |
| EP | 2339135 A1 | 6/2011 |
| EP | 2371451 A1 | 10/2011 |
| EP | 2371452 A1 | 10/2011 |
| EP | 2375021 A1 | 10/2011 |
| EP | 2388072 A1 | 11/2011 |
| EP | 2502662 A1 | 9/2012 |
| EP | 2641651 A2 | 9/2013 |
| GB | 2580515 B | 4/2021 |
| GB | 2580516 B | 4/2021 |
| JP | H05504600 A | 7/1993 |
| JP | H10249124 A | 9/1998 |
| JP | H10263340 A | 10/1998 |
| JP | 2003245562 A | 9/2003 |
| JP | 2004076717 A | 3/2004 |
| JP | 2005230656 A | 9/2005 |
| JP | 2012206061 A | 10/2012 |
| RU | 2335339 C1 | 10/2008 |
| RU | 2 660 737 C2 | 7/2018 |
| WO | 9947260 A1 | 9/1999 |
| WO | 2011121562 A1 | 10/2011 |
| WO | 2011151711 A1 | 12/2011 |
| WO | 2018115900 A1 | 6/2018 |

* cited by examiner

TREATMENT OF PARTICULATE FILTERS

The present disclosure relates to a method for treating a filter for filtering particulate matter from exhaust gas. In particular the invention relates to an enhancement of a method of coating a filter comprising a porous substrate having inlet surfaces and outlet surfaces, wherein the inlet surfaces are separated from the outlet surfaces by a porous structure. The filter may be a wall-flow filter.

BACKGROUND TO THE DISCLOSURE

There are concerns about emissions of particulate matter (PM), commonly referred to as soot, from internal combustion engines and especially from diesel and gasoline engines in automotive applications. The main concerns are associated with potential health effects, and in particular with very tiny particles having sizes in the nanometer range.

Diesel particulate filters (DPFs) and gasoline particulate filters (GPFs) have been fabricated using a variety of materials including sintered metal, ceramic or metal fibres etc., with the most common type in actual mass production being the wall-flow kind made from porous ceramic material fabricated in the form of a monolithic array of many small channels running along the length of the body. Alternate channels are plugged at one end so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminium titanate. The actual shape and dimensions of practical filters on vehicles as well as properties such as the channel wall thickness and its porosity etc. depend on the application concerned. The average dimensions of the pores in the filter channel walls of a ceramic wall-flow filter through which the gas passes are typically in the range 5 to 50 µm and usually about 20 µm. In marked contrast, the size of most diesel particulate matter from a modern passenger car high speed diesel engine is very much smaller, e.g. 10 to 200 nm.

Some PM may be retained within the pore structure in the filter walls and this may in some applications gradually build up until the pores are bridged over by a network of PM and this PM network then enables the easy formation of a cake of particulate on the internal walls of the filter channels. The particulate cake is an excellent filter medium and its presence affords very high filtration efficiency. In some applications soot is burned continuously on the filter as it is deposited which prevents a particulate cake from building up on the filter. For some filters, for example light duty diesel particulate filters, it is periodically necessary to remove trapped PM from the filter to prevent the build-up of excessive back pressure that is detrimental to engine performance and can cause poor fuel economy. So in diesel applications, retained PM is removed from the filter by burning it in air in a process during which the amount of air available and the amount of excess fuel used to achieve the high temperature needed to ignite the retained PM are very carefully controlled. Towards the end of this process, that is usually called regeneration, the removal of the last remaining particulate in the filter can lead to a marked decrease in filtration efficiency and release of a burst of many small particles into the environment. Thus, filters may have low filtration efficiency when they are first used and subsequently after each regeneration event and also during the latter part of each regeneration process.

Thus, it would be desirable to improve and or maintain filtration efficiency at all times—for example during the early life of a filter when it is first used, and or during regeneration and immediately afterwards, and or when the filter is loaded with soot.

Liu, X., Szente, J., Pakko, J., Lambert, C. et al., "Using Artificial Ash to Improve GPF Performance at Zero Mileage," SAE Technical Paper 2019-01-0974, 2019, doi: 10.4271/2019-01-0974 describes a process for loading a bare filter substrate with submicron alumina particles generated by an atomizer to fabricate an "artificial ash" coating to reduce soot emission during cold start conditions. The process consists of generating aerosol particles by atomizing a liquid suspension with compressed air, drying the resulting ash containing droplets by flowing them through an oven, and loading the dried ash particles into the filter via their capture by filtration. The process utilises a high capacity atomizer (model PLG-2100, PALAS, Germany) to provide 100 l/min flow rate for full size bricks. Loading of the filter is monitored by the pressure drop across the filter and PM concentration before and after the filter recorded by a DustTrak aerosol monitor (TSI Inc, Minnesota, USA). While said process shows a reduction in soot emissions during cold start conditions, it is limited to substances that can be spray dried, requires an atomizer, drying oven and aerosol monitor and the artificial ash loading conditions may be constrained by the conditions necessary to achieve complete drying of the liquid aerosol before it reaches the filter substrate.

WO2011/151711 describes a method of making a filter for filtering particulate matter from exhaust gas emitted from a lean-burn internal combustion engine. The filter comprises a porous substrate having inlet surfaces and outlet surfaces, wherein the inlet surfaces are separated from the outlet surfaces by a porous structure containing pores of a first mean pore size. The inlet surfaces comprise a bridge network comprising interconnected particles of refractory material over the pores of the porous structure. The method comprises the step of contacting inlet surfaces of the filter substrate with an aerosol comprising refractory material in dry powder form. While said process shows a reduction in PM emissions for filters when first used and subsequently after each regeneration event, it would be desirable to provide an improved process, in particular, with respect to the controllability of the parameters of the filter produced.

US2019/0048771 describes engine exhaust particulate filters including a porous substrate having thereon inert nanoparticles at a concentration ranging from 0.01 g/L to 60 g/L relative to a filter volume of the substrate, a portion of the nanoparticles arranged to form regeneration resistant porous structures configured to capture particulates from an exhaust gas stream. While said filters purport to provide an improvement in the zero-mileage efficiency of particulate filters it would be desirable to provide an improved process, in particular to improve controllability and flexibility of the process.

SUMMARY OF THE DISCLOSURE

In a first aspect the present disclosure provides a method for treating a filter for filtering particulate matter from exhaust gas, the method comprising the steps of:
    a) containing a dry powder in a reservoir;
    b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;

d) transferring the dry powder from the reservoir to a spray device located upstream of the inlet face of the filter; and e) spraying the dry powder, using the spray device, towards the inlet face of the filer such that the dry powder is entrained in the primary gas flow and passes through the inlet face of the filter to contact the porous structure.

Beneficially it has been found that establishing the primary gas flow by applying a pressure reduction to the outlet face of the filter may provide a more controllable process.

Preferably the transfer of the dry powder from the reservoir to the spray device is controllable independently of establishing and controlling the primary gas flow; and optionally the spraying of the dry powder towards the inlet face of the filter is controllable independently of establishing and controlling the primary gas flow. Beneficially by controlling the transfer and/or spraying of the dry powder from the reservoir to the spray device independently of controlling the establishing and controlling of the primary gas flow, a more controllable process may be achieved. For example, the gas flow speed and/or volumetric flow rate of the primary gas flow may be altered without altering the transfer rate and/or speed and/or spray velocity of the dry powder from the spray device. This is in contrast to a method where the primary gas flow through the filter is also used to fluidize a dry powder.

Preferably the primary gas flow is established before the dry powder is transferred to the spray device and sprayed towards the inlet face. Beneficially this may allow a more uniform gas flow to be established through the porous structure before the start of spraying of the dry powder. In turn, this may achieve a better dispersion of the dry powder into and through the porous structure.

Preferably in step d) a secondary gas flow, separate to the primary gas flow, is used to assist in transfer of the dry powder to the spray device. Preferably the secondary gas flow is controllable independently of the primary gas flow. Beneficially by controlling the primary gas flow independently of controlling the secondary gas flow, a more controllable process may be achieved. For example the volumetric flow rate of the secondary gas flow may be chosen to optimise the spray characteristics of the dry powder at one or more outlets of the spray device and separately the volumetric flow rate of the primary gas flow can be chosen to optimise deposition of the dry powder in the porous structure of the filter.

In various embodiments the method further comprises the step of f) stopping the spraying of the dry powder towards the inlet face of the filter; wherein the primary gas flow is a continuous gas flow from step c) to step f); wherein the secondary gas flow is applied only for a portion of the period from step c) to step f). The secondary gas flow may be applied as a single burst or a plurality of intermittent bursts during said portion of the period from step c) to step f).

In various embodiments the method further comprises the step of g) maintaining the primary gas flow through the porous structure of the filter for a time period after the stopping of the spraying of the dry powder in step f).

The secondary gas flow may comprise a flow of compressed gas, preferably air.

The secondary gas flow may be used to assist in transfer of the dry powder to the spray device and to dispense the dry powder from the spray device. Beneficially using the same gas flow to assist in transport of the dry powder and spray the dry powder may provide a more controllable and/or simplified method.

In various embodiments the spray device may be a compressed air gun.

Preferably the method comprises using a vacuum generator to establish the primary gas flow through the porous structure of the filter. Preferably a level of the pressure reduction generated by the vacuum generator may be controllable independently of a speed or mass rate of the transfer of the dry powder from the reservoir to the spray device. Beneficially this may provide a more controllable process.

The primary gas flow may have a volumetric flow rate of 10 m$^3$/hr to 5,000 m$^3$/hr, preferably 400 m$^3$/hr to 2,000 m$^3$/hr, preferably 600 m$^3$/hr to 1000 m$^3$/hr.

In various embodiments the method further comprises monitoring a back pressure of the filter during at least step e). Preferably the method further comprises using a pressure sensor, preferably a single pressure sensor, to monitor the back pressure.

The pressure sensor, preferably the single pressure sensor, may be located in a filter holder or other housing fluidly connected to the outlet face of the filter.

In various embodiments the method further comprises the step of stopping the spraying of the dry powder towards the inlet face of the filter when a pre-determined back pressure of the filter is reached. The back pressure is defined as the difference in pressure between the inlet face and the outlet face of the filter. The inlet face of the filter may be subject to atmospheric pressure. Consequently, in such an arrangement the back pressure may be measured by measuring the pressure at the outlet face of the filter with a single pressure sensor. Beneficially this may allow for a more controllable and reproducible method that may, in particular, avoid undesirably large back pressures of the filter.

The pre-determined back pressure may be an absolute back pressure. The absolute back pressure may be 20-180 mbar at a flowrate of 600 m$^3$ hr. The back pressure may be measured, for example, by use of a SF-1020 Probench from SuperFlow Dynamometers & Flowbenches of Sussex, WI, USA.

In various embodiments the method further comprises the step of monitoring the back pressure of the filter during at least step c) and step e), preferably during at least steps c), d) and e). Preferably the method further comprises using a pressure sensor, preferably a single pressure sensor, to monitor the back pressure. The pressure sensor, preferably the single pressure sensor, may be located in a filter holder or other housing fluidly connected to the outlet face of the filter. The same pressure sensor, preferably the same single pressure sensor, may be used to monitor the back pressure of the filter during at least steps c) and e).

In various embodiments the method further comprises the step of stopping the spraying of the dry powder towards the inlet face of the filter when a pre-determined back pressure of the filter is reached. The pre-determined back pressure may be a relative back pressure. A first back pressure of the filter may be measured in step c) before the dry powder is deposited in the porous structure and a second back pressure of the filter may be measured in step e) during deposition of the dry powder in the porous structure, wherein the spraying of the dry powder may be stopped when the second back pressure reaches a predetermined percentage of the first back pressure. Beneficially this may allow for a more controllable and reproducible method that may, in particular, avoid undesirably large increases in the back pressures of the filter.

Preferably the predetermined percentage is from 105% to 200%, preferably 125% to 150%, i.e. the second back pressure may be increased by 5% to 100%, preferably 25% to 50% of the first back pressure.

In various embodiments the method further comprises the step of stopping the spraying of the dry powder towards the inlet face of the filter when a pre-determined total spraying time is reached. The pre-determined total spraying time may be from 1 to 60 seconds, preferably from 1 to 10 seconds, preferably from 1 to 5 seconds, preferably from 2 to 5 seconds, preferably 3 seconds.

In various embodiments the method further comprises the step of stopping the spraying of the dry powder towards the inlet face of the filter when a target mass of the dry powder has been sprayed towards the inlet face of the filter.

In various embodiments the method further comprises the steps of monitoring a back pressure of the filter during at least step e) and stopping the spraying of the dry powder towards the inlet face of the filter when either a pre-determined total spraying time or a pre-determined back pressure of the filter is first reached. The pre-determined back pressure may be an absolute back pressure.

In various embodiments the method further comprises monitoring the back pressure of the filter during at least step c) and step e), preferably during at least steps c), d) and e). The pre-determined back pressure may be a relative back pressure.

In various embodiments the method further comprises providing a maximum loading of the filter of <10 g/l of the dry powder, preferably <5 g/l of the dry powder, preferably <2 g/l of the dry powder.

In various embodiments the dry powder may have a tapped density of less than 0.10 $g/cm^3$, optionally less than 0.08 $g/cm^3$, optionally less than 0.07 $g/cm^3$, optionally less than 0.06 $g/cm^3$, optionally less than 0.05 $g/cm^3$.

The dry powder preferably has a d50 (by volume) less than 25 microns, preferably less than 20 microns, more preferably less than 10 microns.

The dry powder may comprise one or more refractory powders, preferably comprising one or more fumed refractory powders, and or one or more aerogels. The one or more fumed refractory powders may be produced by a pyrogenic process, for example flame pyrolysis.

The one or more fumed refractory powders may comprise one or more of fumed alumina, fumed silica, fumed titania, other fumed metal oxide and fumed mixed oxides.

The one or more aerogels may comprises one or more of silica aerogel, alumina aerogel, carbon aerogel, titania aerogel, zirconia aerogel, ceria aerogel, a metal oxide aerogel and mixed oxide aerogels.

In various embodiments the dry powder when aerosol-deposited into the porous substrate of the filter forms a porous coating.

In step e) the dry powder may be sprayed from one or more outlets of the spray device. The one or more outlets of the spray device may comprise an aperture size of 1 to 10 mm. The aperture may be circular, part-circular or slot-shaped.

In various embodiments the dry powder is sprayed from one or more fixed outlets of the spray device.

In various embodiments the dry powder is sprayed from one or more mobile outlets of the spray device, preferably from one or more oscillating outlets.

Preferably the method comprises in step e) channeling the dry powder from the spray device to the inlet face of the filter within a flow conduit.

In various embodiments the flow conduit provides an unimpeded flow path between the spray device and the inlet face of the filter.

In various embodiments the flow conduit comprises a flow conditioner interposed between the spray device and the inlet face of the filter, the flow conditioner acting to promote dispersion of the dry powder within the gas flow. The flow conditioner may comprise one or more of a static mixer, mesh, a sieve, a baffle, and an orificed plate.

The inlet face of the filter may be located from 10 to 80 cm, preferably 15 to 20 cm from the spray device. Additionally or alternatively the spray device may be located at a distance from the inlet face of the filter that is up to 4 times a diameter of the inlet face of the filter.

In various embodiments the method further comprises in step d) dosing the dry powder from the reservoir. The dosing may comprise dosing by one or more of by weight, by volume, by particle number, by time. Preferably the method comprises gravimetrically feeding a dosing device with the dry powder. The dosing may use a loss in weight feeder. Beneficially the use of a dosing device, preferably a gravimetrically-fed dosing device may provide a more controllable and accurate dosing of the dry powder.

In step a) the dry powder may be contained in one or more hoppers.

In step b) the filter may be located in the holder in a vertical orientation with the inlet face uppermost. In step d) the spray device may be located vertically above the inlet face; and preferably a spray direction of the spray device may be co-axial with a longitudinal axis of the filter; and preferably the spray direction and the longitudinal axis are coincident. Beneficially this arrangement may provide a more simplified process and better dispersion of the dry powder.

Alternatively, the arrangement may be reversed with the spray device located vertically below the inlet face such that the spray device sprays the dry powder upwards.

In various embodiments the method further comprises after step e) calcining the filter.

In various embodiments the method further comprises before step b) coating the filter with a washcoat, preferably a catalyst washcoat. Thereafter, the method may comprise the step of calcining the washcoated filter.

The porous substrate may be a wall-flow filter.

In a second aspect the present disclosure provides an apparatus for treating a filter for filtering particulate matter from exhaust gas comprising:

i) a reservoir for containing a dry powder;

ii) a filter holder for holding a filter, the filter being of a type that comprises a porous substrate having an inlet face and an outlet face, the inlet face and the outlet face being separated by a porous structure;

iii) a vacuum generator for establishing in use a primary gas flow through the porous structure of the filter by applying a pressure reduction to the outlet face of the filter;

iv) a transport device for transporting the dry powder from the reservoir towards the filter;

iv) a spray device for receiving the dry powder from the transport device and spraying the dry powder towards the inlet face of the filter and v) a controller configured to control operation of at least the vacuum generator and the spray device.

Beneficially it has been found that using a vacuum generator to establish the primary gas flow may provide a more controllable apparatus.

Preferably the controller is configured to control the transfer of the dry powder from the reservoir to the spray device by the transport device independently of controlling the primary gas flow produced by the vacuum generator; and optionally the controller is configured to control spraying of the dry powder towards the inlet face of the filter independently of controlling the primary gas flow. Beneficially by controlling the transfer device and/or the spray device independently of controlling the vacuum generator, a more controllable apparatus may be achieved. For example, the gas flow speed and/or volumetric flow rate of the primary gas flow may be altered without altering the transfer rate and/or speed and/or spray velocity of the dry powder from the spray device. This is in contrast to an apparatus where the primary gas flow through the filter is also used to fluidize a dry powder.

Preferably the controller is configured to operate the vacuum generator to establish the primary gas flow before the dry powder is transferred to the spray device and sprayed towards the inlet face. Beneficially this may allow a more uniform gas flow to be established through the porous structure before the start of spraying of the dry powder. In turn, this may achieve a better dispersion of the dry powder into and through the porous structure.

Preferably the transport device and/or the spray device comprises a secondary gas flow generator, separate to the vacuum generator, for transferring the dry powder to the spray device. Preferably the controller is configured to control the secondary gas flow generator independently of the vacuum generator. Beneficially by controlling the vacuum generator independently of controlling the secondary gas flow generator, a more controllable process may be achieved.

In various embodiments the controller is configured to operate the vacuum generator to maintain the primary gas flow as a continuous gas flow through the porous structure and to operate the secondary gas flow generator for only a portion of a period of the primary gas flow. Preferably the controller is configured to operate the secondary gas flow generator in a single burst or a plurality of intermittent bursts during the period of the primary gas flow.

The secondary gas flow generator may comprise a compressed gas generator, preferably a compressed air generator. In various embodiments the spray device may be a compressed air gun.

Preferably the controller is configured to control the vacuum generator to control a level of the pressure reduction applied to the outlet face of the filter independently of controlling the transport device and/or the spray device to control a speed or mass rate of the dry powder sprayed towards the inlet face of the filter. Beneficially this may provide a more controllable apparatus.

Preferably the controller is configured to operate the vacuum generator such that the gas flow has a volumetric flow rate of 10 m³/hr to 5,000 m³ hr, preferably 400 m³/hr to 2,000 m³ hr, preferably 600 m³/hr to 1000 m³ hr.

The apparatus may further comprise a pressure sensor, preferably a single pressure sensor, for monitoring a back pressure of the filter, wherein the controller may be configured to receive an output from the pressure sensor. The pressure sensor, preferably the single pressure sensor, may be located in the vacuum generator, preferably in a filter holder or other housing of the vacuum generator.

Preferably the controller is configured to stop the spraying of the dry powder towards the inlet face of the filter when a pre-determined back pressure of the filter is reached. The pre-determined back pressure may be an absolute back pressure. Beneficially this may avoid undesirably large back pressures of the filter.

The pre-determined back pressure may be a relative back pressure. The controller may be configured to obtain a first back pressure of the filter from the pressure sensor before the dry powder is deposited in the porous structure and a second back pressure of the filter from the pressure sensor during deposition of the dry powder in the porous structure, wherein controller maybe configured to stop the spraying of the dry powder when the second back pressure reaches a predetermined percentage of the first back pressure. Beneficially this may avoid undesirably large increases in the back pressure of the filter.

Preferably the predetermined percentage is from 105% to 200%, preferably 125% to 150%, i.e. the second back pressure may be increased by 5% to 100%, preferably 25% to 50% of the first back pressure.

In various embodiments the controller may be configured to stop the spraying of the dry powder towards the inlet face of the filter when a pre-determined total spraying time is reached. The pre-determined total spraying time may be from 1 to 60 seconds, preferably from 1 to 10 seconds, preferably from 1 to 5 seconds, preferably from 2 to 5 seconds, preferably 3 seconds.

In various embodiments the controller may be configured to stop the spraying of the dry powder towards the inlet face of the filter when a target mass of the dry powder has been sprayed towards the inlet face of the filter.

In various embodiments the apparatus comprises a pressure sensor, preferably a single pressure sensor, for monitoring a back pressure of the filter, wherein the controller may be configured to receive an output from the pressure sensor; and wherein the controller may be configured to stop the spraying of the dry powder towards the inlet face of the filter when either a pre-determined total spraying time or a pre-determined back pressure of the filter is first reached. The pre-determined back pressure may be an absolute back pressure. The pre-determined back pressure may be a relative back pressure.

The reservoir may contain a dry powder comprising one or more refractory powders, preferably comprising one or more fumed refractory powders, and or one or more aerogels.

The one or more fumed refractory powders may comprise one or more of fumed alumina, fumed silica, fumed titania, other fumed metal oxide and fumed mixed oxides.

The one or more aerogels may comprises one or more of silica aerogel, alumina aerogel, carbon aerogel, titania aerogel, zirconia aerogel, ceria aerogel, a metal oxide aerogel and mixed oxide aerogels.

In various embodiments the spray device comprises one or more outlets. The one or more outlets of the spray device may comprise an aperture size of 1 to 10 mm. The aperture may be circular, part-circular or slot-shaped.

In various embodiments the one or more outlets are one or more fixed outlets.

In various embodiments the one or more outlets are one or more mobile outlets, preferably one or more oscillating outlets.

In various embodiments the transport device comprises a conduit extending at least partially from the reservoir to the spray device: and the spray device comprises a compressed air supply of a compressed air gun which is configured to fluidize the dry powder in at least a portion of the conduit.

Preferably the apparatus further comprises a flow conduit located between the spray device and the inlet face of the filter. The flow conduit may be empty so as to provide an unimpeded flow path between the spray device and the inlet face of the filter. The flow conduit may comprise a flow conditioner interposed between the spray device and the inlet face of the filter, the flow conditioner acting to promote dispersion of the dry powder within the gas flow. The flow conditioner may comprise one or more of a static mixer, a mesh, a sieve, a baffle, and an orificed plate.

The inlet face of the filter may be located from 10 to 80 cm, preferably 15 to 20 cm from the spray device. Additionally or alternatively the spray device may be located at a distance from the inlet face of the filter that is up to 4 times a diameter of the inlet face of the filter.

In various embodiments the apparatus further comprises a dosing device for dosing the dry powder from the reservoir. The dosing device may be configured to dose by one or more of by weight, by volume, by particle number, by time. The dosing device may be a gravimetric dosing device. The dosing device maybe a loss in weight feeder. Beneficially the use of a dosing device, preferably a gravimetrically-fed dosing device may provide a more controllable and accurate dosing of the dry powder.

The reservoir may be one or more hoppers.

The filter may be located in the holder in a vertical orientation with the inlet face uppermost. The spray device may be located vertically above the inlet face: and preferably a spray direction of the spray device may be co-axial with a longitudinal axis of the filter; and preferably the spray direction and the longitudinal axis are coincident. Beneficially this arrangement may provide a more simplified process and better dispersion of the dry powder.

In a third aspect the present disclosure provides a treated filter obtainable by the method of the first aspect described above.

In this specification the term "filter" refers to a porous substrate that has a porous structure suitable for filtering particulate matter from exhaust gas. The porous substrate may be formed for example from sintered metal, ceramic or metal fibres etc. The filter may be of the wall-flow kind made from porous material, for example ceramic, fabricated in the form of a monolithic array of many small channels running along the length of the body. For example, the filter may be formed from cordierite, various forms of silicon carbide or aluminium titanate.

The filter may be a "bare" filter or alternatively may be one with an incorporated catalytic function ability such as oxidation, NOx-trapping, or selective catalytic reduction activity. The porous substrate may comprise a composition (known as a washcoat) that coats the porous structure of the filter. The washcoat may be a catalytic washcoat. The catalytic washcoat may comprise a catalyst, selected from the group consisting of a hydrocarbon trap, a three-way catalyst (TWC), a NOx absorber, an oxidation catalyst, a selective catalytic reduction (SCR) catalyst, a lean NOx catalyst and combinations of any two or more thereof. The catalyst, for example the TWC, NOx absorber, oxidation catalyst, hydrocarbon trap and the lean NOx catalyst, may contain one or more platinum group metals, particularly those selected from the group consisting of platinum, palladium and rhodium.

Consequently, the coated filter may, for example, be a catalysed soot filter (CSF), a selective catalytic reduction filter (SCRF), a lean NOx trap filter (LNTF), a gasoline particulate filter (GPF), an ammonia slip catalyst filter (ASCF) or a combination of two or more thereof (e.g. a filter comprising a selective catalytic reduction (SCR) catalyst and an ammonia slip catalyst (ASC).

The shape and dimensions of the filter, for example properties such as the channel wall thickness and its porosity etc. may be varied depending on the intended application for the filter. The filter may be configured for use with an internal combustion engine to filter the exhaust gas emitted by the internal combustion engine. The internal combustion engine may be a gasoline spark ignition engine. However, the filter finds particular application when configured for use with an internal combustion engine in the form of a diesel or gasoline engine.

In this specification the term "dry powder" refers to a particulate composition that is not suspended or dissolved in a liquid. It is not meant to necessarily imply a complete absence of all water molecules. The dry powder is preferably free-flowing.

In this specification the term "bulk density" refers to the bulk density as measured according to Method 1 of Section 2.9.34 of European Pharmacopoeia 7.0 wherein first a quantity of powder sufficient to complete the test is passed through a sieve with apertures greater than or equal to 1.0 mm, if necessary, to break up agglomerates that may have formed during storage. Next, approximately 5 g (m) of the test sample weighed with 0.1 percent accuracy is introduced, without compacting, into a dry, graduated, 250 mL cylinder (readable to 2 mL). If necessary, the powder is carefully leveled without compacting, and the unsettled apparent volume ($V_0$) is read to the nearest graduated unit. The bulk density in g/cm$^3$ is calculated using the formula m/$V_0$.

In this specification the term "tapped density" refers to the tapped density of the powder as measured according to Method 1 of Section 2.9.35 of European Pharmacopoeia 7.0 with 1250 taps.

In this specification the term "g/l" (grams per litre) refers to the mass of dry powder divided by the volume of the filter.

In this specification the terms "loading" and "mass loading" when referencing the quantity of refractory powder, refer to the mass of powder added to a filter and may be measured by weighing the filter before and after application of the powder to the filter.

In this specification the term "envelope volume" refers to the surface volume of a filter such as would be obtained by tightly shrinking a film to contain it, but excluding the volume of the channels. It includes: the solid material of the filter, the open and closed pores of the porous structure of the filter and surface defects/voids. The envelope volume of a filter may be measured by Hg intrusion Porosimetry (MIP). For example, this may be carried out using the following process:

1. Take 6 even spaced samples from the filter.
2. Measure the envelope volume of each sample by MIP and divide by the sample mass.
3. Take an average of these and multiply by the filter mass.
4. This is the filter envelope volume.

In this specification the term "d50 (by volume)" refers to a d50 (by volume) measurement as measured by a Malvem Mastersizerm 3000 with Aero s dispersion unit, available from Malvem Panalytical Ltd, Malvem, UK. Dispersion conditions: Air pressure=2 barg, feed rate=65%, hopper gap=1.2 mm. Refractive index and absorbtion parameters set in accordance with instructions provided in the Malvem Mastersizer® 3000 User Manual.

In this specification the term "filtration efficiency" refers to the filtration efficiency as measured using a Cambustion® Diesel Particulate Filter Testing System available from Cambustion Ltd. of Cambridge, UK with the following test conditions:

1. The filter is preconditioned in an oven at 700° C. for 2 hours
2. The filter is placed on the test rig:
    a) Stabilisation—250 kg/h mass flow, 50° C., 5 mins
    b) Warm up—250 kg/h mass flow, 240° C., 5 mins
    c) Weighing—filter removed from rig and weighed
    d) Warm up—filter returned to rig; 250 kg/h mass flow, 240° C., 5 mins
    e) Loading Phase—250 kg/h mass flow, 240° C., loading rate: for GPF filters—2 g/h until 2 g/l soot load reached; for SCRF/CSF filters—10 g/h until 6 g/l soot reached
    f) Weighing—filter removed from rig and weighed.
The fuel used during the test is: Carcal RF-06-08 B5

During the test, the particle counter continuously samples downstream of the filter. Immediately before and after a batch of filters are tested, an "Upstream" test is run on the rig to allow the particle counter to sample the raw soot production from the rig. The Upstream test is 20 minutes long and uses the same conditions as the Loading Phase above. Comparing the average of the two Upstream tests (before and after filter testing) with the data from the Loading phase of the filter test gives the filtration efficiency. The filtration efficiency is quoted at a specified soot loading.

In this specification the term "vacuum generator" refers to an apparatus or combination of apparatus that function to produce a pressure reduction. Non-limiting examples of suitable apparatus include vacuum generators that operate on the venturi principle, vacuum pumps, for example rotary vane and liquid ring vacuum pumps, and regenerative blowers.

In this specification the term "pressure sensor" refers to an apparatus or combination of apparatus that function to measure an absolute and/or relative pressure. Non-limiting examples of suitable apparatus include pressure transducers which may be diaphragm pressure transducers. For example, a Wika® P30 pressure transmitter, available from WIKA Alexander Wiegand SE & Co. KG, Klingenberg, Germany may be used.

In this specification the term 'controller' refers to a function that may comprise hardware and/or software. The controller may comprise a control unit or may be a computer program running on a dedicated or shared computing resource. The controller may comprise a single unit or may be composed of a plurality of sub-units that are operatively connected. The controller may be located on one processing resource or may be distributed across spatially separate processing resources. The controller may comprise a microcontroller, one or more processors (such as one or more microprocessors), memory, configurable logic, firmware, etc.

BRIEF DESCRIPTION OF THE DRAWINGS

Aspects and embodiments of the present disclosure will now be described, by way of example only, with reference to the accompanying drawings, in which.

DETAILED DESCRIPTION

The skilled reader will recognise that one or more features of one aspect or embodiment of the present disclosure may be combined with one or more features of any other aspect or embodiment of the present disclosure unless the immediate context teaches otherwise.

Figure 1:
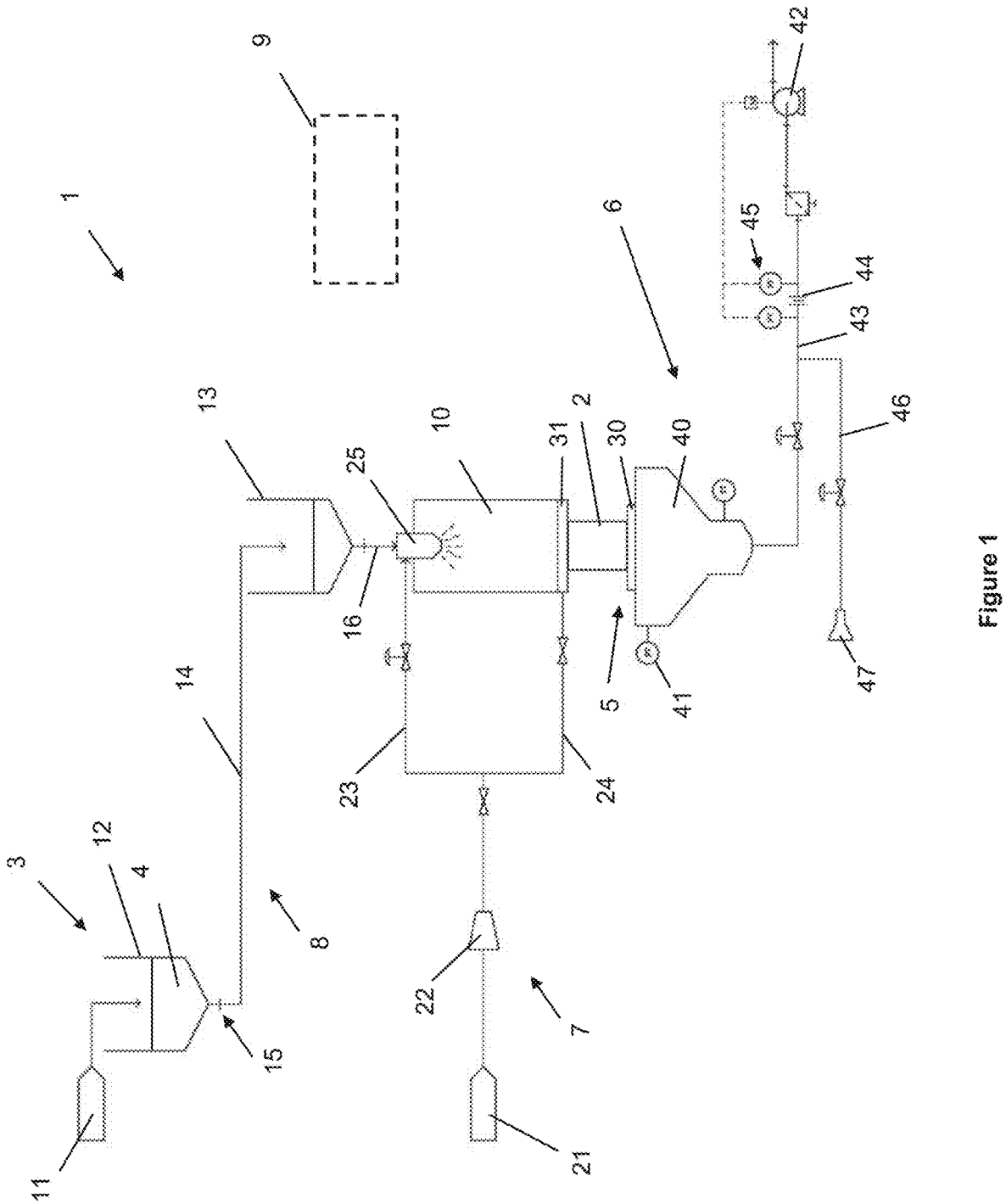
FIG. 1 is a schematic diagram of an apparatus for treating a filter for filtering particulate matter from exhaust gas according to the present disclosure.

An example of an apparatus in accordance with the present disclosure will now be described with reference to FIG. 1 which shows a schematic diagram of an apparatus 1 for treating a filter 2 for filtering particulate matter from exhaust gas. The filter 2 is of a type that comprises a porous substrate having an inlet face and an outlet face, the inlet face and the outlet face being separated by a porous structure.

The apparatus 1 comprises a reservoir 3 for containing a dry powder 4. A filter holder 5 is provided for holding the filter 2. A vacuum generator 6 is provided for establishing in use a primary gas flow through the porous structure of the filter 2 by applying a pressure reduction to the outlet face of the filter 2. A transport device 8 is provided for transporting the dry powder 4 from the reservoir 3 to a spray device 7. The spray device 7 is provided for receiving the dry powder 4 from the transport device 8 and spraying the dry powder 4 towards the inlet face of the filter 2. A controller 9 is provided which is configured to control operation of the apparatus 1.

The reservoir 3 may receive dry powder 4 from a dry powder inlet 11. The dry powder inlet 11 may be an output of an upstream bulk supply of the dry powder. For example the dry powder inlet 11 may be a conduit connected upstream to a further reservoir of the dry powder 4. The dry powder inlet 11 may represent a manual, semi-automatic or automatic re-filling of the reservoir 3 through a lid or opening of the reservoir 3.

The reservoir 3 may comprise one or more hoppers. The reservoir 3 may comprise one hopper. In the illustrated example of FIG. 1, the reservoir 3 comprises a first hopper 12 and a second hopper 13. The second hopper 13 may be downstream of the first hopper 12 to receive dry powder 4 output from the first hopper 12. The one or more hoppers may be provided in separate housings. Alternatively, the one or more hoppers may be provided in a single housing. The one or more hoppers may comprise one or more chambers of a single container.

The reservoir 3 may comprise a dosing device 15. The dosing device 15 may dose the dry powder 4 by one or more of by weight, by volume, by particle number, by time. The dosing device 15 may be located at or near an outlet of the reservoir 3. The dosing device 15 may be located at or near an outlet of the one or more hoppers of the reservoir 3. The dosing device may be located at or near the outlet of the first hopper 12.

The dosing device 15 may be gravimetrically-fed with the dry powder 4 from the reservoir 3.

The dosing device 15 may be a loss in weight feeder. Non-limiting examples of suitable dosing devices include the Coperion® K-Tron Type K2-ML-T35 Gravimetric twin screw feeder available from Coperion GmbH, Stuttgart, Germany and the All-Fill® Series S1 Micro-Fill available from All-Fill International Ltd, Sandy, UK.

The transport device 8 transports the dry powder 4 from the reservoir 3 to the spray device 7. The transport device 8 may gravimetrically feed the dry powder 4 at least part way towards the spray device 7.

The transport device 8 may comprise one or more components. The transport device 8 may comprise one or more conduits, for example, passages, pipes, hoses, etc.

Where the reservoir 3 comprises more than one hopper the transport device 8 may transport the dry powder 4 between the hoppers. The transport device 8 may gravimetrically feed the dry powder 4 between the hoppers. The transport device 8 may comprise a first conduit 14 extending between the first hopper 12 and the second hopper 13. The first conduit 14 may extend from a first housing to a second housing. Alternatively, the first conduit 14 may extend from a first chamber to a second chamber of a single container. The dry powder 4 may be gravimetrically fed along the first conduit 14.

The transport device 8 may comprise a second conduit 16 extending from the second hopper 13 to the spray device 7.

The spray device 7 is provided for receiving the dry powder 4 from the transport device 8 and spraying the dry powder 4 towards the inlet face of the filter 2. The spray device 7 may comprise a secondary gas flow generator for generating a secondary gas flow that may be used to spray the dry powder 4 towards the inlet face of the filter 2.

The spray device 7 may further comprise one or more outlets for discharging the dry powder 4 towards the inlet face of the filter 2. The one or more outlets of the spray device may comprise an aperture size of 1 to 10 mm. The aperture may be circular, part-circular or slot-shaped. The one or more outlets may be one or more fixed outlets. Alternatively, the one or more outlets may be one or more mobile outlets, for example one or more oscillating outlets.

The one or more outlets may be provided in one or more nozzles. Each of the one or more nozzles may comprise one or more spray outlets. In the illustrated example of FIG. 1 a single nozzle 25 is provided which comprises a plurality of spray outlets.

The secondary gas flow generator may comprise a compressed gas generator. In the illustrated example of FIG. 1 the secondary gas flow generator comprises a compressed air generator which may comprise a compressor 22. The compressor 22 may receive air from an air inlet 21 and supply compressed air to the one or more outlets of the spray device 7 via a feed line 23. A return line 24 may be provided. Valves and controls necessary for operation may be provided as will be known to the skilled person.

An interconnection between the transport device 8 and the spray device 7 may be provided at which interconnection the dry powder 4 is transferred into the spray device 7 from the transport device 8. The interconnection may be provided at or near the one or more outlets of the spray device 7. In one example, the interconnection may be provided in the nozzle 25. Alternatively, the interconnection may be provided at or near the reservoir 3, for example at or near the second hopper 13 of the reservoir 3. In one example, the interconnection is a fluid connection between the feed line 23 and the second conduit 16. For example, the secondary gas flow of the spray device 7 may be fluidly connected with the second conduit 16 at or near an outlet of the second hopper 13 to fluidize the dry powder 4 to assist transport of the dry powder along at least a portion of the second conduit 16. For example, the secondary gas flow of the spray device 7 may entrain the dry powder 4 from the second conduit 16. For example, the secondary gas flow of the spray device 7 may produce a suction force in the second conduit to draw the dry powder 4 into the secondary gas flow.

In one example the spray device 7 comprises a compressed air gun. A non-limiting example of a suitable compressed air gun is the STAR Professional gravity feed spray gun 1.4 mm, part no. STA2591100C.

The filter holder 5 may function to maintain the filter 2 in a stationary position during treatment. The filter holder 5 may grip an upper and/or a lower end of the filter 2. The filter holder 5 may comprise an inflatable upper seal bladder 31 (also called an upper inflatable collar) and/or an inflatable lower seal bladder 30 (also called a lower inflatable collar) that support respective upper and lower ends of the filter 2. The inflatable upper seal bladder 31 and the inflatable lower seal bladder 30 may contact and/or engage with an exterior surface of the filter 2. Each may form a liquid or air tight seal around the filter 2. The inflatable upper seal bladder 31 and the inflatable lower seal bladder 30 may be supported by one or more housings (e.g. supported by an internal wall of the one or more housings).

The apparatus 1 may be configured such that the filter 2 is located in the filter holder 5 in a vertical orientation with the inlet face of the filter uppermost. At least a portion of the spray device 7 may be located vertically above the inlet face. A spray direction of the spray device 7 may be co-axial with a longitudinal axis of the filter 2. The spray direction and the longitudinal axis of the filter 2 may be coincident.

The apparatus 1 may further comprise a flow conduit 10 located between the spray device 7 and the inlet face of the filter 2. The flow conduit 10 may function to constrain and channel the primary gas flow towards the inlet face of the filter 2. The flow conduit 10 may function to align the primary gas flow such that a flow direction of the primary gas flow when it contacts the inlet face of the filter 2 is normal to the inlet face.

The flow conduit 10 may be empty so as to provide an unimpeded flow path between the spray device 7 and the inlet face of the filter 2. Alternatively, the flow conduit 10 may comprise a flow conditioner interposed between the spray device 7 and the inlet face of the filter 2, the flow conditioner acting to promote dispersion of the dry powder 4. For example, the flow conditioner may comprise one or more of a static mixer, a mesh, a sieve, a baffle, and an orificed plate.

The flow conduit 10 may comprise a tube. The flow conduit 10 may comprise a cross-sectional shape that matches the cross-sectional shape of the inlet face of the filter 2. The flow conduit 10 may comprise a size that matches the size of the inlet face of the filter 2.

The spray device 7 may extend into the flow conduit 10. The one or more outlets of the spray device 7 may be located within the flow conduit 10. For example, the nozzle 25 may be located within an upper region of the flow conduit 10. The nozzle 25 may be located coincident with a longitudinal axis of the filter 2.

The inlet face of the filter 2 may be located from 10 to 80 cm, preferably 15 to 20 cm from the spray device, for example from the nozzle 25 of the spray device 7. Additionally or alternatively the spray device, for example from the nozzle 25 of the spray device 7, may be located at a distance from the inlet face of the filter 2 that is up to 4 times a diameter of the inlet face 2 of the filter.

The vacuum generator 6 is provided for establishing in use the primary gas flow through the porous structure of the filter 2 by applying a pressure reduction to the outlet face of the filter 2. The vacuum generator 6 may comprise a vacuum cone 40 that may define a funnel that engages the outlet face of the filter 2. The inflatable lower seal bladder 30 may form a seal between the outlet face of the filter 2 and the vacuum cone 40. The vacuum generator 6 may comprise a vacuum pump 42 connected to the flow cone by a conduit 43. The vacuum pump 42 may be controlled to control the volumetric flow rate of the primary gas flow.

The vacuum generator 6 may be provided with a volumetric flow rate sensor. The volumetric flow rate sensor may be an orifice plate 44 in combination with pressure sensors 45 located along the conduit 43. The vacuum generator 6 may comprise a bypass conduit 46 extending to an intake 47.

The apparatus 1 may further comprises a pressure sensor 41 for monitoring a back pressure of the filter 2. A single pressure sensor 41 may be used. The single pressure sensor 41 may be located in the vacuum generator 6, preferably in a filter holder or other housing, for example the vacuum cone 40, of the vacuum generator.

The controller 9 controls operation of at least the vacuum generator 6 and the spray device 7. In FIG. 1 operative connections between the controller 9 and a remainder of the apparatus 1 are omitted for clarity. However, the skilled person would be aware that necessary connections of any suitable means may be provided. Such connections may be wired or wireless.

The controller 9 may be configured to control the transfer of the dry powder 4 from the reservoir 3 to the spray device 7 by the transport device 8 independently of controlling the primary gas flow produced by the vacuum generator 6. For example the controller 9 may control operation of the dosing device 15.

The controller 9 may be configured to control spraying of the dry powder 4 towards the inlet face of the filter 2 independently of controlling the primary gas flow. Use of the term 'independently' in the present specification refers to the ability of the controller 9 to control each of the variables of the spraying of the dry powder 4 and the primary gas flow individually and irrespective of the status of the other variable. For example the controller 9 may establish the primary gas flow without simultaneously spraying the dry powder 4. For example the controller 9 may increase or decrease the rate of spraying of the dry powder 4 without altering the volumetric flow rate of the primary gas flow. For example, the controller 9 may increase or decrease the volumetric flow rate of the primary gas flow without altering the rate of spraying of the dry powder 4. For example the controller 9 may control operation of the spray device 7 independently of controlling operation of the vacuum pump 42.

The controller 9 may be configured to operate the vacuum generator 6 to establish the primary gas flow before the dry powder 4 is transferred to the spray device 7 and sprayed towards the inlet face of the filter 2.

The controller 9 may be configured to control the secondary gas flow generator, for example the compressor 22, independently of the vacuum generator 6. The controller 9 may be configured to operate the vacuum generator 6 to maintain the primary gas flow as a continuous gas flow through the porous structure and to operate the secondary gas flow generator, for example the compressor 22, for only a portion of a period of the primary gas flow.

The controller 9 may be configured to control the vacuum generator 6 to control a level of the pressure reduction applied to the outlet face of the filter 2 independently of controlling the transport device 8 and/or the spray device 7 to control a speed or mass rate of the dry powder 4 sprayed towards the inlet face of the filter 2.

The controller 9 may be configured to stop the spraying of the dry powder 4 towards the inlet face of the filter 2 when a pre-determined back pressure of the filter 2 is reached, for example as detected by the pressure sensor 41. The pre-determined back pressure may be an absolute back pressure or alternatively may be a relative back pressure.

The controller 9 may be configured to stop the spraying of the dry powder 4 towards the inlet face of the filter 2 when a pre-determined total spraying time is reached.

The apparatus 1 may be used to treat a filter with a dry powder 4 comprising one or more refractory powders, preferably comprising one or more fumed refractory powders, and or one or more aerogels. The one or more fumed refractory powders may comprise one or more of fumed alumina, fumed silica, fumed titania, other fumed metal oxide and fumed mixed oxides. The one or more aerogels may comprises one or more of silica aerogel, alumina aerogel, carbon aerogel, titania aerogel, zirconia aerogel, ceria aerogel, a metal oxide aerogel and mixed oxide aerogels.

The dry powder 4 may have a tapped density of less than 0.10 g/cm$^3$, optionally less than 0.08 g/cm$^3$, optionally less than 0.07 g/cm$^3$, optionally less than 0.06 g/cm$^3$, optionally less than 0.05 g/cm$^3$. The dry powder 4 preferably has a d50 (by volume) less than 25 microns, preferably less than 20 microns, more preferably less than 10 microns.

An example of a method of treating a filter in accordance with the present disclosure will now be described with reference to FIG. 2 which shows a flow diagram illustrating a method for manufacturing a filter 2 incorporating use of the apparatus 1. By way of example only the method will described with reference to a filter 2 provided with a catalytic coating.

In step S21 a catalytic slurry is prepared by methods as known in the art.

In step S22 a washcoat is prepared from the catalytic slurry by methods as known in the art. The washcoat may be, for example, a hydrocarbon trap, a three-way catalyst (TWC), a NOx absorber, an oxidation catalyst, a selective catalytic reduction (SCR) catalyst, a lean NOx catalyst and combinations of any two or more thereof.

In step S23 the washcoat is dosed and applied to a bare filter 2 by methods as known in the art. For example the washcoat may be applied to a first face of the filter 2 (e.g. an upper face) and an opposite, second face (e.g. a lower face) of the filter 2 may be subjected to at least a partial vacuum to achieve movement of the washcoat through the porous structure of the filter 2. The filter 2 may be coated in a single dose wherein washcoat may be applied to the filter 2 in a single step with the filter 2 remaining in a single orientation. Alternatively, the filter 2 may be coated in two doses. For example, in a first dose the filter 2 may be in a first orientation with a first face uppermost and a second face lowermost. A coating may be applied to the first face and coats a portion of the length of the filter 2. The filter 2 may then be inverted so that the second face is uppermost. A coating may then be applied to the second face in order to coat the portion of the filter 2 that was uncoated by the first dose. Beneficially, a two-dose process may allow different coatings to be applied to each end of the filter 2.

In step S24 the filter 2 may be dried.

In step S25 the filter 2 may be calcined by methods as known in the art.

In optional step S26 the back pressure of the filter 2 before treatment may be measured.

In optional step S27 the filter 2 may be placed in stock to await treatment. Thereafter, in step S28 the filter 2 may be removed from stock and passed for treatment. Alternatively, the filter 2 may be treated immediately, i.e. by proceeding directly to step S29.

In step S29 the filter 2 is treated according to the present disclosure as will be described in further detail below with reference to FIG. 3.

In step S30, after treatment, the filter 2 may be calcined by methods as known in the art.

In optional step S31 the back pressure of the filter 2 after treatment may be measured.

In step S32 the finished filter 2 may be readied for delivery to a customer.

Figure 2:
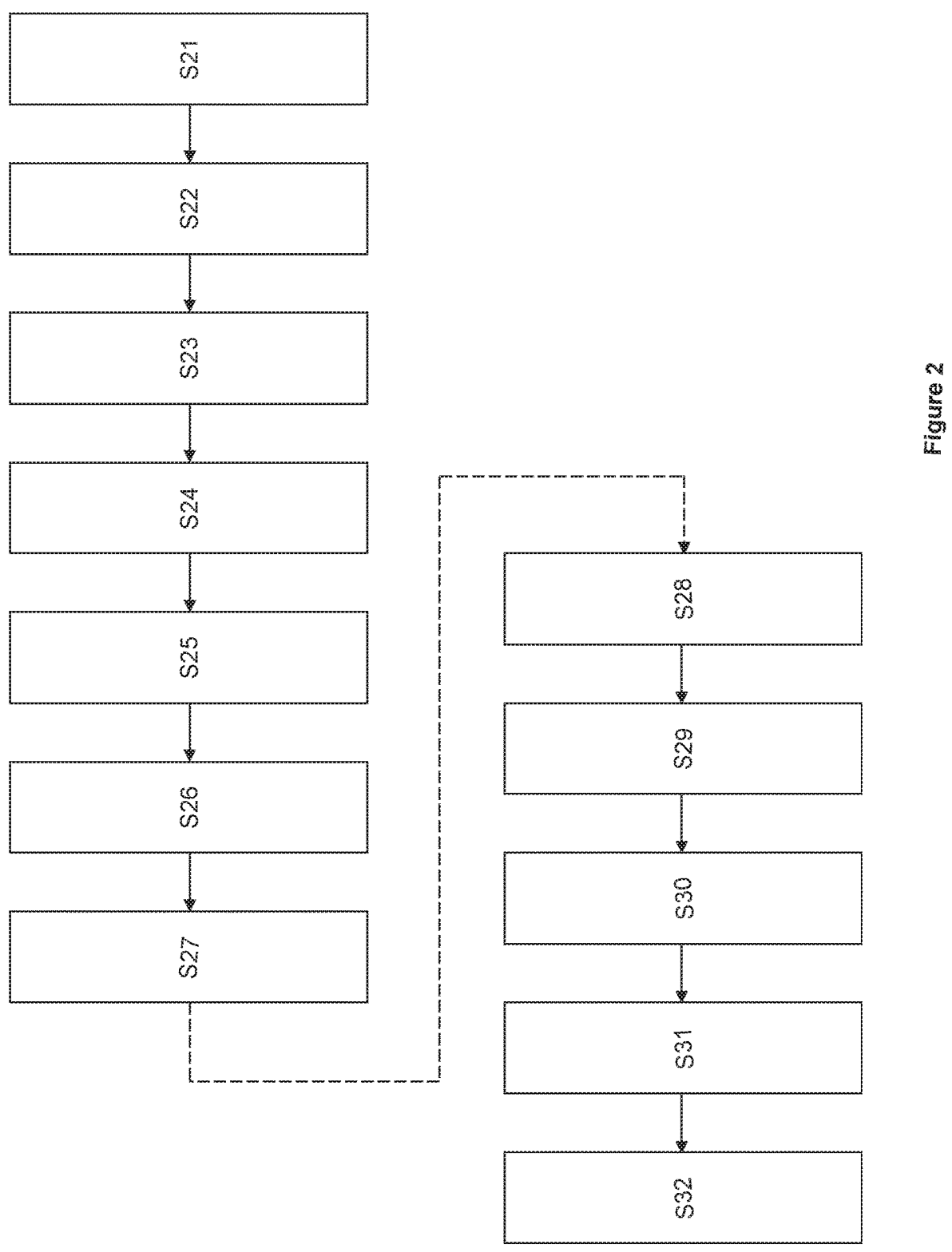
FIG. 2 is a flow diagram illustrating a method for manufacturing a filter according to the present disclosure incorporating a method for treating a filter using the apparatus of FIG. 1.
Figure 3:
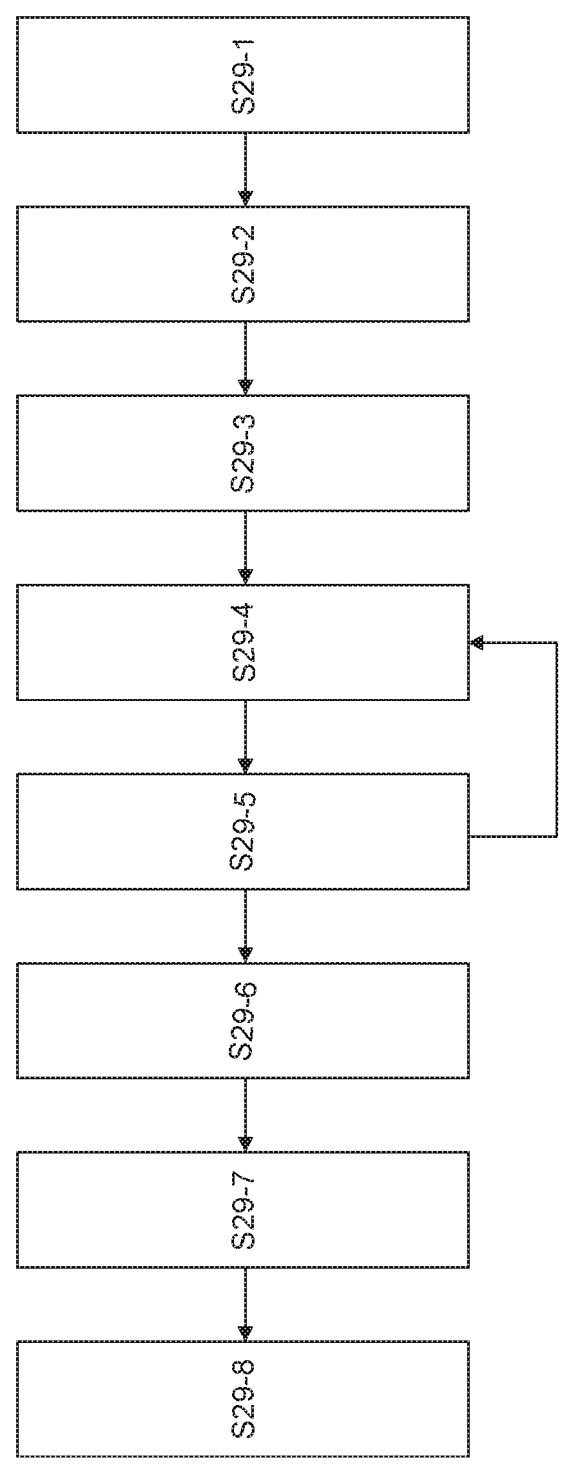
FIG. 3 is a flow diagram illustrating a method for treating a filter for filtering particulate matter from exhaust gas using the apparatus of FIG. 1.

FIG. 3 shows a flow diagram illustrating the treatment of step S29 of FIG. 2.

In step S29-1 the filter may be loaded into the filter holder 5. The filter 2 may be held in a stationary position during treatment. The filter 2 may be gripped by the filter holder 5 at an upper and/or a lower end of the filter 2. The inflatable upper seal bladder 31 and the inflatable lower seal bladder 30 may be inflated to contact and/or engage with the exterior surface of the filter 2. The filter 2 may be held in a vertical orientation with the inlet face of the filter uppermost. Operation of the filter holder 5, for example inflation of the inflatable upper seal bladder 31 and the inflatable lower seal bladder 30 may be controlled by the controller 9.

In step S29-2 the vacuum generator 6 may activated by the controller 9 to establish the primary gas flow through the filter 2. Preferably, the primary gas flow is established before the dry powder 4 is transferred to the spray device 7 and sprayed towards the inlet face of the filter 2. A level of the pressure reduction generated by the vacuum generator 6 may be controlled by the controller 9 independently of a speed or mass rate of the transfer of the dry powder 4 from the reservoir 3 to the spray device 7. The primary gas flow may have a volumetric flow rate of 10 m$^3$/hr to 5,000 m$^3$/hr, preferably 400 m$^3$/hr to 2,000 m$^3$/hr, preferably 600 m$^3$/hr to 1000 m$^3$/hr.

In step S29-3 the back pressure of the filter 2 may be measured while the primary gas flow is established but before the secondary gas flow is established. The back pressure may be measured by use of the pressure sensor 41. The back pressure measurement in step S29-3 may be in addition to, or in place of the back pressure measurement of step S26. Alternatively, the back pressure measurement of step S26 may be used in place of the back pressure measurement of step S29-3. The back pressure measurement of step S26 and/or the back pressure measurement of step S29-3 may be used by the controller 9 as a measure of a first back pressure of the filter 2 prior to treatment.

In step S29-4 the dry powder 4 is sprayed at the inlet face of the filter 2 by the spray device 7. During spraying of the dry powder 4 the dry powder 4 may be supplied to the spray device 7 by the transport device 8.

The spraying of the dry powder 4 towards the inlet face of the filter 2 is preferably controllable by the controller 9 independently of establishing and controlling the primary gas flow.

During step S29-4 the secondary gas flow, for example supplied by the compressor 22, which is separate to the primary gas flow, may be used to transfer the dry powder 4 from the reservoir 3 to the spray device 7. Preferably the secondary gas flow is controllable by the controller 9 independently of the primary gas flow. For example the controller 9 may control operation of the compressor 22 and/or the valves and/or the nozzle 25 of the spray device 7 independently of controlling operation of the vacuum pump 42. The dry powder 4 may be sprayed towards the inlet face of the filter 2 by use of the secondary gas flow. The secondary gas flow may comprise a flow of compressed gas, preferably air.

During step S29-4 the primary gas flow is preferably maintained as a continuous flow. During step S29-4 the secondary gas flow may be applied as a single burst or a plurality of intermittent bursts.

In step S29-5 the back pressure of the filter 2 may be monitored. The back pressure may be monitored by use of the pressure sensor 41. The controller 9 may be configured to stop the spraying of the dry powder 4 towards the inlet face of the filter 2 when a pre-determined back pressure is reached. If the pre-determined back pressure has not yet been reached then the controller 9 be configured to return to step S29-4 and continue spraying of the dry powder 4. This feedback may be continuous and need not involve any pause in the spraying of the dry powder 4, i.e. the controller 9 may continuously monitor the back pressure of the filter 2 as spraying of the dry powder 4 is on-going.

The pre-determined back pressure may be an absolute back pressure. The absolute back pressure may be between 20-180 mbar at a flowrate of 600 m$^3$ hr.

Alternatively, the pre-determined back pressure may be a relative back pressure. For example a back pressure relative to the first back pressure of the filter 2 prior to treatment measured in step S26 and/or step S29-3 may be used. The back pressure may be measured as a percentage of the first back pressure. The predetermined back pressure when spraying of the dry powder 4 is stopped may be from 105% to 200%, preferably 125% to 150%, of the first back pressure.

In addition or alternatively, spraying of the dry powder 4 towards the inlet face of the filter 2 may be stopped when a pre-determined total spraying time is reached. The pre-determined total spraying time may be from 1 to 60 seconds, preferably from 1 to 10 seconds, preferably from 1 to 5 seconds, preferably from 2 to 5 seconds, preferably 3 seconds.

The controller 9 may be configured to stop the spraying of the dry powder 4 towards the inlet face of the filter 2 when either a pre-determined total spraying time or a pre-determined back pressure of the filter is first reached or a target mass of the dry powder has been sprayed towards the inlet face of the filter.

In step S29-6 the spraying of the dry powder 4 is stopped. For example this may be achieved by the controller 9 stopping transfer of the dry powder by the transport device 8 and/or by stopping the secondary gas flow of the spray device 7. Preferably in step S29-6 the primary gas flow is maintained through the porous structure of the filter 2 for a time period after the stopping of the spraying of the dry powder 4. The controller 9 may be configured to operate the vacuum generator 6 for a time period after the stopping of the spraying of the dry powder 4.

Optionally, in step S29-6 the quantity of dry powder 4 delivered towards the inlet face of the filter 2 may be measured. The controller 9 be configured to determine the quantity of the dry powder 4 delivered from signal outputs from the dosing device 15, for example from an output from the loss in weight feeder.

The method may be configured to deliver a maximum loading of the filter 2 of <10 g/l of the dry powder 4, preferably <5 g/l of the dry powder 4, preferably <2 g/l of the dry powder 4.

In step S29-7 the primary gas flow through the filter 2 is stopped. This may be achieved by the controller 9 stopping the vacuum generator 6, i.e. stopping the vacuum pump 42.

Alternatively, this may be achieved by the controller operating valves of the vacuum generator 6 to divert the suction through the bypass conduit 46 to draw air in through intake 47. This may avoid the need to stop the vacuum pump 42 between treatments of successive filters 2 which may lead to a faster cycle time.

In step S29-8 the filter 2 is unloaded from the filter holder 5 by, for example, deflating the inflatable upper seal bladder 31 and the inflatable lower seal bladder 30. The filter 2 may then be removed and passed to step S30 as described above.

Figure 4:
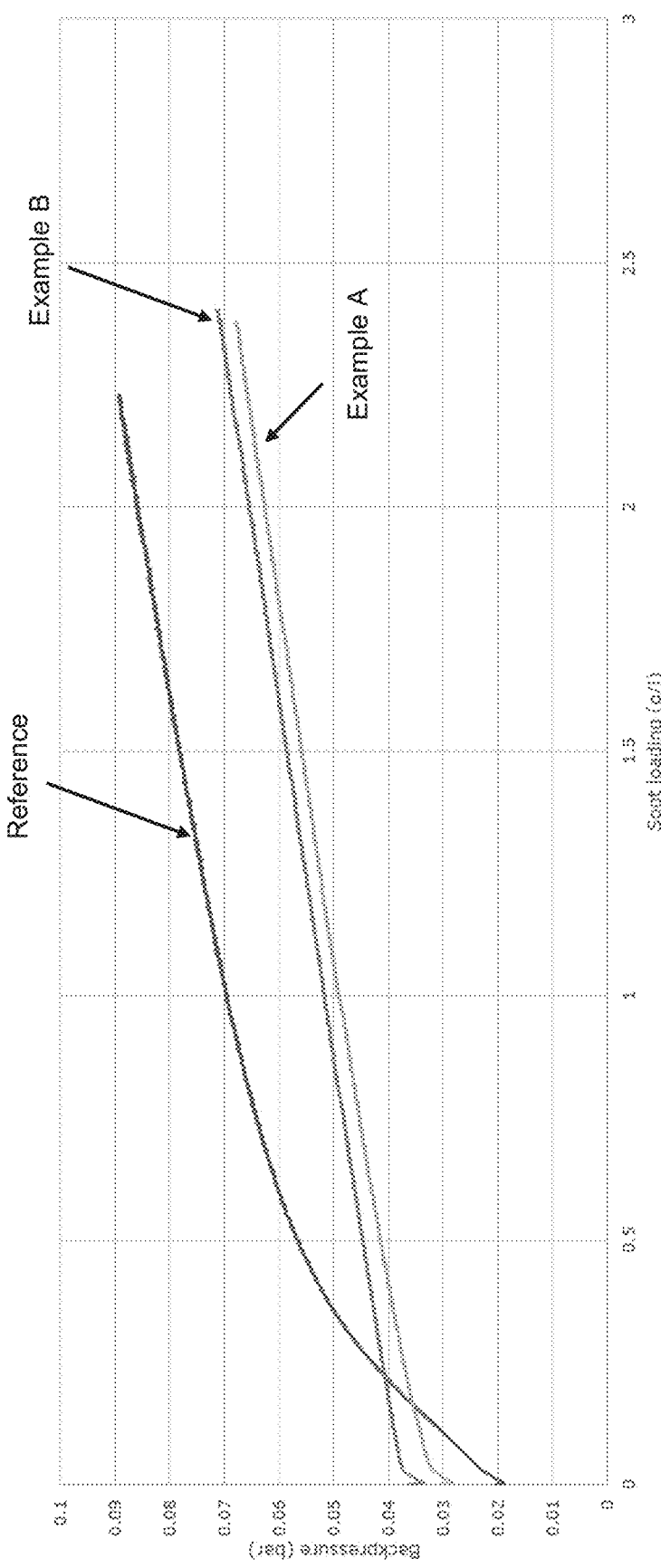
FIG. 4 is a graph showing a soot loading—back pressure response curve for various filters.

FIG. 4 is a graph showing a soot loading—back pressure response curve for a Reference filter which has not been treated with a refractory power and two example filters—Example A and Example B—that have been treated with a refractory powder. The Reference filter exhibits a steeply increasing back pressure response for soot loadings from initiation up to about 0.4 g/l. Thereafter, the response curve is a substantially straight loading-back pressure response for soot loadings greater than about 0.4 g/l. By comparison, the Example A and Example B filters exhibit a substantially straight loading-back pressure response for soot loadings greater than only 0.1 g/l. In addition, the absolute back pressure at a specific soot loading level is significantly less than for the Reference filter. Consequently, the treated filters of Example A and Example B have a substantially linear back pressure—soot loading response except for a very small initial soot loading of as little as about 0.05 g/l.

According to the present disclosure a treated filter may be provided having one or more advantages compared to prior art filters. Preferably, but not exclusively, the treated filter may be treated according to the present disclosure and or treated using the apparatus according to the present disclosure.

EXAMPLES

Standard Loading Process

In the following examples the treated filters were loaded with the refractory powder using the following 'standard' loading process using an apparatus of the type shown in FIG. 1, unless otherwise specified.

1 The diameter of the flow conduit was the same as the inlet face of the filter.

2 A primary gas flow of 550 m³/hr of air was pulled through the filter using a downstream regenerative blower.

3 Back pressure was monitored with a Wika® P30 pressure transmitter located below the filter.

4 The refractory powder was dispersed into the primary gas flow using a STAR Professional gravity feed spray gun 1.4 mm part no. STA2591100C. The STAR Professional gravity feed spray gun was mounted 100 mm from the inlet face of the filter.

5 After loading was completed the filter was calcined at 500° C. for 1 hour.

In cases where the back pressure parameter was used to determine the point of stopping of spraying of the refractory powder, the back pressure was monitored using the above-noted pressure transmitter. In cases where the mass of refractory powder sprayed was used to determine the point of stopping of spraying of the refractory powder, the mass was monitored by periodically removing the spray gun hopper for weighing.

In the following examples 'CFBP' refers to Cold Flow Back Pressure in mbar at 600 m³/hr and all filtration efficiencies are quoted at 0.02 g/l soot loading.

Refractory Powders

In the following examples the following refractory powders were used:

1 Aeroxide® Alu130 fumed aluminium oxide, available from Evonik Industries AG of Essen, Germany. Tapped density was 0.05 g/l and d50 was 5.97 microns.

2 A Silica Aerogel. Tapped density was less than 0.10 g/l and d50 was less than 10 microns. Silica Aerogels are available from, for example, The Dow Chemical Company of Midland, MI, USA, Enersens SAS of Bourgoin Jallieu, France, and JIOS Aerogel Corporation of Gyeonggi-do, Korea.

3 An AEI zeolite. Tapped density was 0.30 g/l and d50 was 0.9 microns.

Examples 1 and 2

Three SCRF filters were prepared, each from the same SiC, 300/12, 3.76 L substrate type. Each filter was washcoated with the same small-pore Cu-exchanged zeolite SCR catalyst with a washcoat loading of 1.93 g/in³. The Example 1 and Example 2 filters were loaded with the Aeroxide® Alu130 noted above using the standard loading process described above with back pressure used to determine the point of stopping of spraying of the refractory powder. The Comparative 1 filter was not loaded with any refractory powder. The following results were obtained:

| | Powder used | Initial CFBP (mbar) | Powder Loading (g/l) | Final CFBP (mbar) | Filtration efficiency (%) |
|---|---|---|---|---|---|
| Comparative 1 | None | 41.0 | n/a | n/a | 76.27 |
| Example 1 | Aeroxide ® Alu130 | 41.3 | 1.9 | 69.5 | 99.94 |
| Example 2 | Aeroxide ® Alu130 | 40.9 | 2.7 | 73.5 | 99.98 |

As can be seen from the results, the treatment of the filter according to the present disclosure has resulted in a substantial improvement in the initial filtration efficiency of the filter. In particular, the present inventors have found that treatment of the filter with a refractory powder having a tapped density less than 0.10 g/l permits substantial improvements in the filtration efficiency to be obtained even at very low loading levels of less than 3 g/l. Without wishing to be bound by theory it is believed that the refractory powder, which is preferably aerosol-deposited, provides a highly efficient filtering medium for the filter during initial use and, where appropriate, after regeneration even at very low soot loadings, where no particulate cake of soot would have been yet built-up.

Examples 3 and 4

Three GPF filters were prepared, each from the same cordierite, 300/8, 1.26 L substrate type. Each filter was washcoated with the same TWC catalyst having a PGM loading of 14.8 g/ft³ and a PGM ratio (Pt:Pd:Rh) of 0:10:1 with a washcoat loading of 1.1 g/in³. The Example 3 and Example 4 filters were loaded with the Silica Aerogel noted above using the standard loading process described above with back pressure used to determine the point of stopping of spraying of the refractory powder. The Comparative 2 filter was not loaded with any refractory powder. The following results were obtained:

| | Powder used | Initial CFBP (mbar) | Powder Loading (g/l) | Final CFBP (mbar) | Filtration efficiency (%) |
|---|---|---|---|---|---|
| Comparative 2 | None | 56.7 | n/a | n/a | 62.2 |
| Example 3 | Silica Aerogel | 56.7 | 0.6 | 62.8 | 91.1 |
| Example 4 | Silica Aerogel | 56.7 | 1.4 | 69.9 | 97.7 |

As can be seen from the results, the treatment of the filter according to the present disclosure has resulted in a substantial improvement in the initial filtration efficiency of the filter. In particular, the present inventors have found that treatment of the filter with a refractory powder having a tapped density less than 0.10 g/l permits substantial improvements in the filtration efficiency to be obtained even at very low loading levels of less than 2 g/l.

Example 5

Two SCRF filters were prepared, each from the same SiC, 300/12, 3.00 L substrate type. Each filter was coated with the same small-pore Cu-exchanged zeolite SCR catalyst with a washcoat loading of 1.52 g/in$^3$. The Example 5 filter was loaded with the AEI zeolite noted above using the standard loading process described above with mass of refractory powder used to determine the point of stopping of spraying of the refractory powder. The Comparative 3 filter was not loaded with any refractory powder. The following results were obtained:

| | Powder used | Initial CFBP (mbar) | Powder Loading (g/l) | Final CFBP (mbar) | Filtration efficiency (%) |
|---|---|---|---|---|---|
| Comparative 3 | None | 45.9 | n/a | n/a | 59.0 |
| Example 5 | AEI zeolite | 46.1 | 5.0 | 69.7 | 77.0 |

As can be seen from the results, the use of a refractory powder with a relatively high tapped density of 0.30 g/l (that is outside the scope of the present disclosure) in the Example 5 filter does not achieve the same substantial increases in filtration efficiency exhibited by Examples 1 to 4. The present inventors theorise that it is particularly beneficial to use a refractory powder with a very low tapped density of less than 0.10 g/l. This is particulary the case where the powder is pulled through the filter using a primary gas flow. It is theorised that the very low tapped density of the refractory powder—and thus the very low momentum of the refractory powder particles—is beneficial in promoting better dispersion of the powder in the primary gas flow and in the porous substrate and in particular allowing a greater proportion of the refractory powder to be deposited within the porous structure of the plurality of filter walls.

Example 6

An SCRF filter was prepared, from the same SiC, 300/12, 3.76 L substrate type as Examples 1 and 2. The filter was washcoated with the same small-pore Cu-exchanged zeolite SCR catalyst as Examples 1 and 2 with a washcoat loading of 1.93 g/in$^3$. The Example 6 filter was loaded with the Aeroxide® Alu130 noted above using a modified loading process. The modified loading process was the same as the standard loading process described above except that no primary gas flow was used to pull the powder into the filter.

Instead only the secondary gas flow from the spray gun was used to blow the powder into the filter. This secondary gas flow was approximately 3.5 m$^3$/hr. The mass of refractory powder was used to determine the point of stopping of spraying of the refractory powder. The following results were obtained:

| | Powder used | Initial CFBP (mbar) | Powder Loading (g/l) | Final CFBP (mbar) | Filtration efficiency (%) |
|---|---|---|---|---|---|
| Example 1 | Aeroxide® Alu130 | 41.3 | 1.9 | 69.5 | 99.94 |
| Example 2 | Aeroxide® Alu130 | 40.9 | 2.7 | 73.5 | 99.98 |
| Example 6 | Aeroxide® Alu130 | 44.9 | 1.9 | 77.6 | 98.2 |

During powder loading of Example 6 it was observed that there was considerable backflow/turbulence visible above the inlet face of the filter—which could be seen from the powder movement in the gas flow. At the end of the loading it was further observed that there was powder build-up on the inlet face of the filter. When split in half it was observed that there was considerable build-up of powder filling the inlet channels at the outlet end of the filter. It is theorised that the effect of the primary gas flow in Examples 1 and 2 combined with the very low tapped density of the refractory powder is beneficial in promoting better dispersion of the powder in the primary gas flow and in the porous substrate and in particular allowing a greater proportion of the refractory powder to be deposited within the porous structure of the plurality of filter walls. When the primary gas flow is absent—as in Example 6, the powder has a deleterious tendency to build-up on the inlet face and at the outlet end of the plugged inlet channels. Consequently, entraining the refractory powder in the primary gas flow that is pulled through the filter promotes better powder dispersion in the porous structure of the plurality of filter walls.

Example 7

Two filters were prepared, each from the same cordierite, 200/8, 3.2 L substrate type. Neither filter was coated with a washcoat, i.e. the substrates were left bare. The Example 7 filter was loaded with the Silica Aerogel noted above using a modified loading process. The modified loading process was the same as the standard loading process described above except that the refractory powder was dispersed into the primary gas flow using a mesh sieve rather than through a spray gun. The mass of refractory powder was used to determine the point of stopping of spraying of the refractory powder. The Comparative 4 filter was not loaded with any refractory powder. The following results were obtained:

| | Powder used | Initial CFBP (mbar) | Powder Loading (g/l) | Final CFBP (mbar) | Filtration efficiency (%) |
|---|---|---|---|---|---|
| Comparative 4 | None | 14.7 | n/a | n/a | 72.8 |
| Example 7 | Silica Aerogel | 14.7 | 1.6 | 18.8 | 96.9 |

As can be seen from the results, the treatment of the filter according to the present disclosure has resulted in a substantial improvement in the initial filtration efficiency of the filter even where a bare, uncoated filter is used.

Examples 8 and 9

An SCRF filter was prepared from the same SiC, 300/12, 3.76 L substrate type as Examples 1 and 2. The filter was washcoated with the same small-pore Cu-exchanged zeolite SCR catalyst as Examples 1 and 2 with a washcoat loading of 1.93 g/in$^3$. The Example 8 filter was loaded with the Aeroxide® Alu130 noted above using the standard loading process described above. The back pressure was used to determine the point of stopping of spraying of the refractory powder.

A GPF filter was prepared from the same 300/8, 1.26 L substrate type as Examples 3 and 4. The filter was wash-coated with a TWC catalyst having a PGM loading of 14.8 g/ft$^3$ and a PGM ratio (Pt:Pd:Rh) of 0:10:1 with a washcoat loading of 1.1 g/in$^3$. The Example 9 filter was loaded with the Aeroxide® Alu130 noted above using the standard loading process described above. The back pressure was used to determine the point of stopping of spraying of the refractory powder.

The following results were obtained:

| | Powder used | Initial CFBP (mbar) | Powder Loading (g/l) | Final CFBP (mbar) |
|---|---|---|---|---|
| Example 8 | Aeroxide ® Alu130 | 41.4 | 1.9 | 67.4 |
| Example 9 | Aeroxide ® Alu130 | 56.7 | 1.4 | 69.9 |

The envelope volumes were calculated using Hg intrusion Porosimetry (MIP). The following results were obtained:

| | Powder used | Envelope volume (ml) | Powder Loading (g) |
|---|---|---|---|
| Example 8 | Aeroxide ® Alu130 | 1609 | 7 |
| Comparative 1 | None | 1393 | 0 |
| Example 9 | Aeroxide ® Alu130 | 463.5 | 1.8 |
| Comparative 2 | None | 429.9 | 0 |

The % Powder$_{in\ wall}$ was then calculated using the formula:

$$\% \text{Powder}_{in\ wall} = \left(1 - \left(\frac{[\text{Envelope volume}_{powder\ coated}\ (\text{ml}) - \text{Envelope volume}_{bare}\ (\text{ml})].\text{Bulk density}\ (\text{g.ml}^{-1})}{\text{Powder loading of filter}\ (\text{g})}\right)\right).100\%.$$

where the Bulk density of the Aeroxide® Alu130 powder as sprayed was 0.016 g/ml.

The results showed that the % Powder$_{in\ wall}$ for Example 8 was 50.6% and for Example 9 was 70.1% evidencing that the methods and apparatus of the present disclosure are effective in obtaining a filter with greater than 40% of the refractory powder located within the porous structure of the plurality of filter walls.

Examples 10 to 13

Six GPF filters were prepared, each from a cordierite, 300/8, 1.68 L substrate type. Three filters had a low mean pore size and three had a high mean pore size. In this specification, "high mean pore size" refers to a mean pore size of a filter that is greater than 2 microns above the nominal or average mean pore size for the substrate type (as quoted by the substrate manufacturer). Likewise, in this specification, "low mean pore size" refers to a mean pore size of a filter that is greater than 2 microns below the nominal or average mean pore size for the substrate type (as quoted by the substrate manufacturer).

Each filter was coated with the same PGM loading of 22 g/ft$^3$ and a PGM ratio (Pt:Pd:Rh) of 0:20:2 with a washcoat loading of 0.8 g/in$^3$. Example filters 10 to 13 were loaded with the Silica Aerogel noted above using the standard loading process described above. The back pressure was used to determine the point of stopping of spraying of the refractory powder for Example filters 10 and 12. The mass of refractory powder was used to determine the point of stopping of spraying of the refractory powder for Example filters 11 and 13. The Comparative 5 and 6 filters were not loaded with any refractory powder. The following results were obtained:

| | Mean Pore Size | Powder used | Initial CFBP (mbar) | Powder Loading (g/l) | Final CFBP (mbar) | Filtration efficiency (%) |
|---|---|---|---|---|---|---|
| Comparative 5 | Low | None | 65.5 | n/a | n/a | 87.1 |
| Example 10 | Low | Silica Aerogel | 65.5 | 0.06 | 74.8 | 96.8 |
| Example 11 | Low | Silica Aerogel | 65.5 | 1.4 | 100.8 | 99.7 |
| Comparative 6 | High | None | 51.3 | n/a | n/a | 58.7 |
| Example 12 | High | Silica Aerogel | 51.3 | 2.7 | 69.8 | 96.8 |
| Example 13 | High | Silica Aerogel | 51.3 | 1.7 | 59.8 | 92.4 |

As can be seen from the results, the treatment of the filters according to the present disclosure has resulted in a substantial improvement in the initial filtration efficiency. In addition, the treatment can permit a reduction in the variability of the back pressure of the filters and in this way mitigate against the effect of varying mean pore size on the back pressure of the filters. For example, it can be seen that the CFBP of the Comparative filters 5 and 6 varies by over 27%. By comparison the CFBP of Example filters 10 and 12 vary by only 7% while still achieving the same enhanced filtration efficiency of 96.8%. Thus, the results evidence that the methods and apparatus of the present disclosure are effective in obtaining a reduction in the relative standard deviation of the back pressure of filters, even where the filters have a variance in mean pore size.

Further aspects and embodiments of the present disclosure are set out in the following clauses:

Clause A1. A method for treating a filter for filtering particulate matter from exhaust gas, the method comprising the steps of:

a) containing a dry powder in a reservoir;

b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;

d) transferring the dry powder from the reservoir to a spray device located upstream of the inlet face of the filter; and e) spraying the dry powder, using the spray device, towards the inlet face of the filter such that the dry powder is entrained in the primary gas flow and passes through the inlet face of the filter to contact the porous structure.

Clause A2. The method of clause A1, wherein the transfer of the dry powder from the reservoir to the spray device is controllable independently of establishing and controlling the primary gas flow; and optionally wherein the spraying of the dry powder towards the inlet face of the filter is controllable independently of establishing and controlling the primary gas flow.

Clause A3. The method of clause A1 or clause A2, wherein the primary gas flow is established before the dry powder is transferred to the spray device and sprayed towards the inlet face.

Clause A4. The method of any preceding clause, wherein in step d) a secondary gas flow, separate to the primary gas flow, is used to transfer the dry powder from the reservoir to the spray device.

Clause A5. The method of clause A4, wherein the secondary gas flow is controllable independently of the primary gas flow.

Clause A6. The method of clause A4 or clause A5, further comprising the step of f) stopping the spraying of the dry powder towards the inlet face of the filter; wherein the primary gas flow is a continuous gas flow from step c) to step f); wherein the secondary gas flow is applied only for a portion of the period from step c) to step f).

Clause A7. The method of clause A6, wherein the secondary gas flow is applied as a single burst or a plurality of intermittent bursts during said portion of the period from step c) to step f).

Clause A8. The method of clause A6 or clause A7, further comprising the step of g) maintaining the primary gas flow through the porous structure of the filter for a time period after the stopping of the spraying of the dry powder in step f).

Clause A9. The method of any one of clauses A4 to A8, wherein the secondary gas flow comprises a flow of compressed gas, preferably air.

Clause A10. The method of anyone of clauses A4 to A9, wherein the secondary gas flow is used to transfer the dry powder from the reservoir to the spray device and to dispense the dry powder from the spray device.

Clause A11. The method of anyone of clauses A4 to A10, wherein the spray device is a compressed air gun.

Clause A12. The method of any preceding clause, comprising using a vacuum generator to establish the primary gas flow through the porous structure of the filter.

Clause A13. The method of clause A12, wherein a level of the pressure reduction generated by the vacuum generator is controllable independently of a speed or mass rate of the transfer of the dry powder from the reservoir to the spray device.

Clause A14. The method of any preceding clause, wherein the primary gas flow has a volumetric flow rate of 10 $m^3$/hr to 5,000 $m^3$/hr, preferably 400 $m^3$ hr to 2,000 $m^3$ hr, preferably 600 $m^3$/hr to 1000 $m^3$ hr.

Clause A15. The method of any preceding clause, further comprising monitoring a back pressure of the filter during at least step e).

Clause A16. The method of clause A15, further comprising using a pressure sensor, preferably a single pressure sensor, to monitor the back pressure.

Clause A17. The method of clause A16, wherein the pressure sensor, preferably the single pressure sensor, is located in a filter holder or other housing fluidly connected to the outlet face of the filter.

Clause A18. The method of anyone of clauses A15 to A17, further comprising the step of stopping the spraying of the dry powder towards the inlet face of the filter when a pre-determined back pressure of the filter is reached.

Clause A19. The method of clause A18, wherein the pre-determined back pressure is an absolute back pressure.

Clause A20. The method of anyone of clauses A15 to A19, further comprising monitoring the back pressure of the filter during at least step c) and step e), preferably during at least steps c), d) and e).

Clause A21. The method of clause A20, further comprising using a pressure sensor, preferably a single pressure sensor, to monitor the back pressure.

Clause A22. The method of clause A21, wherein the pressure sensor, preferably the single pressure sensor, is located in a filter holder or other housing fluidly connected to the outlet face of the filter.

Clause A23. The method of clause A21 or clause A22, wherein the same pressure sensor, preferably the same single pressure sensor, is used to monitor the back pressure of the filter during at least steps c) and e).

Clause A24. The method of any one of clauses A20 to A23, further comprising the step of stopping the spraying of the dry powder towards the inlet face of the filter when a pre-determined back pressure of the filter is reached.

Clause A25. The method of clause A24, wherein the pre-determined back pressure is a relative back pressure.

Clause A26. The method of clause A25, wherein a first back pressure of the filter is measured in step c) before the dry powder is deposited in the porous structure and a second back pressure of the filter is measured in step e) during deposition of the dry powder in the porous structure, wherein the spraying of the dry powder is stopped when the second back pressure reaches a predetermined percentage of the first back pressure.

Clause A27. The method of clause A26, wherein the predetermined percentage is from 105% to 200%, preferably 125% to 150%.

Clause A28. The method of any one of clauses A1 to A14, further comprising the step of stopping the spraying of the dry powder towards the inlet face of the filter when a pre-determined total spraying time is reached.

Clause A29. The method of clause A28, wherein the pre-determined total spraying time is from 1 to 60 seconds, preferably from 1 to 10 seconds, preferably from 1 to 5 seconds, preferably from 2 to 5 seconds, preferably 3 seconds.

Clause A30. The method of any preceding clause, further comprising the step stopping the spraying of the dry powder towards the inlet face of the filter when a target mass of the dry powder has been sprayed towards the inlet face of the filter.

Clause A31. The method of anyone of clauses Alto A14, further comprising the steps of monitoring a back pressure of the filter during at least step e) and stopping the spraying of the dry powder towards the inlet face of the filter when either a pre-determined total spraying time or a pre-determined back pressure of the filter is first reached.

Clause A32. The method of clause A31, wherein the pre-determined back pressure is an absolute back pressure.

Clause A33. The method of clause A31 or clause A32, further comprising monitoring the back pressure of the filter during at least step c) and step e), preferably during at least steps c), d) and e).

Clause A34. The method of clause A33, wherein the pre-determined back pressure is a relative back pressure.

Clause A35. The method of any preceding clause, comprising providing a maximum loading of the filter of <10 g/l of the dry powder, preferably <5 g/l of the dry powder, preferably <2 g/l of the dry powder.

Clause A36. The method of any preceding clause, wherein the dry powder has a tapped density of less than 0.10 g/cm$^3$, optionally less than 0.08 g/cm$^3$, optionally less than 0.07 g/cm$^3$, optionally less than 0.06 g/cm$^3$, optionally less than 0.05 g/cm$^3$ and or the dry powder has a d50 (by volume) less than 25 microns, preferably less than 20 microns, more preferably less than 10 microns.

Clause A37. The method of any preceding clause, wherein the dry powder comprises one or more refractory powders, preferably comprising one or more fumed refractory powders, and or one or more aerogels.

Clause A38. The method of clause A37, wherein the one or more fumed refractory powders comprises one or more of fumed alumina, fumed silica, fumed titania, other fumed metal oxide and fumed mixed oxides.

Clause A39. The method of clause A37, wherein the one or more aerogels comprises one or more of silica aerogel, alumina aerogel, carbon aerogel, titania aerogel, zirconia aerogel, ceria aerogel, a metal oxide aerogel and mixed oxide aerogels.

Clause A40. The method of any preceding clause, wherein in step e) the dry powder is sprayed from one or more outlets of the spray device.

Clause A41. The method of clause A40, wherein the one or more outlets of the spray device comprise an aperture size of 1 to 10 mm.

Clause A42. The method of clause A40 or clause A41, wherein the dry powder is sprayed from one or more fixed outlets of the spray device.

Clause A43. The method of clause A40 or clause A41, wherein the dry powder is sprayed from one or more mobile outlets of the spray device, preferably from one or more oscillating outlets.

Clause A44. The method of any preceding clause, further comprising in step e) channeling the dry powder from the spray device to the inlet face of the filter within a flow conduit.

Clause A45. The method of clause A44, wherein the flow conduit provides an unimpeded flow path between the spray device and the inlet face of the filter.

Clause A46. The method of clause A44, wherein the flow conduit comprises a flow conditioner interposed between the spray device and the inlet face of the filter, the flow conditioner acting to promote dispersion of the dry powder within the gas flow.

Clause A47. The method of clause A46, wherein the flow conditioner comprises one or more of a static mixer, a mesh, a sieve, a baffle, and an orificed plate.

Clause A48. The method of any preceding clause, wherein the inlet face of the filter is located from 10 to 80 cm, preferably 15 to 20 cm from the spray device, and or the spray device is located at a distance from the inlet face of the filter that is up to 4 times a diameter of the inlet face of the filter.

Clause A49. The method of any preceding clause, further comprising in step d) dosing the dry powder from the reservoir.

Clause A50. The method of clause A49, wherein the dosing comprises dosing by one or more of by weight, by volume, by particle number, by time.

Clause A51. The method of clause A49 or clause A50, comprising gravimetrically feeding a dosing device with the dry powder.

Clause A52. The method of any one of clauses A49 to A52, wherein the dosing uses a loss in weight feeder.

Clause A53. The method of any preceding clause, wherein in step a) the dry powder is contained in one or more hoppers.

Clause A54. The method of any preceding clause, wherein in step b) the filter is located in the holder in a vertical orientation with the inlet face uppermost.

Clause A55. The method of clause A54, wherein in step d) the spray device is located vertically above the inlet face; and preferably a spray direction of the spray device is co-axial with a longitudinal axis of the filter; and preferably the spray direction and the longitudinal axis are coincident.

Clause A56. The method of any preceding clause, further comprising after step e) calcining the filter.

Clause A57. The method of any preceding clause, further comprising before step b) coating the filter with a washcoat, preferably a catalyst washcoat.

Clause A58. The method of any preceding clause, wherein the porous substrate is a wall-flow filter.

Clause B1. An apparatus for treating a filter for filtering particulate matter from exhaust gas comprising:

i) a reservoir for containing a dry powder;

ii) a filter holder for holding a filter, the filter being of a type that comprises a porous substrate having an inlet face and an outlet face, the inlet face and the outlet face being separated by a porous structure;

iii) a vacuum generator for establishing in use a primary gas flow through the porous structure of the filter by applying a pressure reduction to the outlet face of the filter;

iv) a transport device for transporting the dry powder from the reservoir towards the filter;

iv) a spray device for receiving the dry powder from the transport device and spraying the dry powder towards the inlet face of the filter; and v) a controller configured to control operation of at least the vacuum generator and the spray device.

Clause B2. The apparatus of clause B1, wherein the controller is configured to control the transfer of the dry powder from the reservoir to the spray device by the transport device independently of controlling the primary gas flow produced by the vacuum generator; and optionally wherein the controller is configured to control spraying of the dry powder towards the inlet face of the filter independently of controlling the primary gas flow.

Clause B3. The apparatus of clause B1 or clause B2, wherein the controller is configured to operate the vacuum generator to establish the primary gas flow before the dry powder is transferred to the spray device and sprayed towards the inlet face.

Clause B4. The apparatus of any one of clauses B1 to B3, wherein the transport device and/or the spray device comprises a secondary gas flow generator, separate to the vacuum generator, which assists in transferring the dry powder to the spray device.

Clause B5. The apparatus of clause B4, wherein the controller is configured to control the secondary gas flow generator independently of the vacuum generator.

Clause B6. The apparatus of clause B4 or clause B5, wherein the controller is configured to operate the vacuum generator to maintain the primary gas flow as a continuous gas flow through the porous structure and to operate the secondary gas flow generator for only a portion of a period of the primary gas flow.

Clause B7. The apparatus of clause B6, wherein the controller is configured to operate the secondary gas flow generator in a single burst or a plurality of intermittent bursts during the period of the primary gas flow.

Clause B7. The apparatus of any one of clauses B4 to B6, wherein the secondary gas flow generator comprises a compressed gas generator, preferably a compressed air generator.

Clause B8. The apparatus of any one of clauses B4 to B7, wherein the spray device is a compressed air gun.

Clause B9. The apparatus of any one of clauses B1 to B8, wherein the controller is configured to control the vacuum generator to control a level of the pressure reduction applied to the outlet face of the filter independently of controlling the transport device and/or the spray device to control a speed or mass rate of the dry powder sprayed towards the inlet face of the filter.

Clause B10. The apparatus of any one of clauses B1 to B9, wherein the controller is configured to operate the vacuum generator such that the gas flow has a volumetric flow rate of 10 $m^3$/hr to 5,000 $m^3$/hr, preferably 400 $m^3$/hr to 2,000 $m^3$/hr, preferably 600 $m^3$/hr to 1000 $m^3$/hr.

Clause B11. The apparatus of anyone of clauses B1 to B10, further comprising a pressure sensor, preferably a single pressure sensor, for monitoring a back pressure of the filter, wherein the controller is configured to receive an output from the pressure sensor.

Clause B12. The apparatus of clause B11, wherein the pressure sensor, preferably the single pressure sensor, is located in the vacuum generator, preferably in a vacuum cone of the vacuum generator.

Clause B13. The apparatus of clause B11 or clause B12, wherein the controller is configured to stop the spraying of the dry powder towards the inlet face of the filter when a pre-determined back pressure of the filter is reached.

Clause B14. The apparatus of clause B13, wherein the pre-determined back pressure is an absolute back pressure.

Clause B15. The apparatus of clause B13, wherein the pre-determined back pressure is a relative back pressure.

Clause B16. The apparatus of clause B15, wherein the controller is configured to obtain a first back pressure of the filter from the pressure sensor before the dry powder is deposited in the porous structure and a second back pressure of the filter from the pressure sensor during deposition of the dry powder in the porous structure, wherein controller is configured to stop the spraying of the dry powder when the second back pressure reaches a predetermined percentage of the first back pressure.

Clause B17. The apparatus of clause B16, wherein the predetermined percentage is from 105% to 200%, preferably 125% to 150%.

Clause B18. The apparatus of any one of clauses B1 to B17, wherein the controller is configured to stop the spraying of the dry powder towards the inlet face of the filter when a pre-determined total spraying time is reached.

Clause B19. The apparatus of clause B18, wherein the pre-determined total spraying time is from 1 to 60 seconds, preferably from 1 to 10 seconds, preferably from 1 to 5 seconds, preferably from 2 to 5 seconds, preferably 3 seconds.

Clause B20. The apparatus of any one of clauses B1 to B19, wherein the controller is configured to stop the spraying of the dry powder towards the inlet face of the filter when a target mass of the dry powder has been sprayed towards the inlet face of the filter.

Clause B21. The apparatus of anyone of clauses B1 to B20, further comprising a pressure sensor, preferably a single pressure sensor, for monitoring a back pressure of the filter, wherein the controller is configured to receive an output from the pressure sensor; and wherein the controller is configured to stop the spraying of the dry powder towards the inlet face of the filter when either a pre-determined total spraying time or a pre-determined back pressure of the filter is first reached.

Clause B22. The apparatus of clause B21, wherein the pre-determined back pressure is an absolute back pressure.

Clause B23. The apparatus of clause B21, wherein the pre-determined back pressure is a relative back pressure.

Clause B24. The apparatus of any one of clauses B1 to B23 wherein the reservoir contains a dry powder comprising one or more refractory powders, preferably comprising one or more fumed refractory powders, and or one or more aerogels.

Clause B25. The apparatus of clause B24, wherein the one or more fumed refractory powders comprises one or more of fumed alumina, fumed silica, fumed titania, other fumed metal oxide and fumed mixed oxides.

Clause B26. The apparatus of clause B25, wherein the one or more aerogels comprises one or more of silica aerogel, alumina aerogel, carbon aerogel, titania aerogel, zirconia aerogel, ceria aerogel, a metal oxide aerogel and mixed oxide aerogels.

Clause B27. The apparatus of any one of clauses B1 to B26 wherein the spray device comprises one or more outlets.

Clause B28. The apparatus of clause B27, wherein the one or more outlets of the spray device comprise an aperture size of 1 to 10 mm.

Clause B29. The apparatus of clause B27 or clause B28, wherein the one or more outlets are one or more fixed outlets.

Clause B30. The apparatus of clause B27 or clause B28, wherein the one or more outlets are one or more mobile outlets, preferably one or more oscillating outlets.

Clause B31. The apparatus of any one of clauses B1 to B30, wherein the transport device comprises a conduit extending at least partially from the reservoir to the spray device; and the spray device comprises a compressed air supply of a compressed air gun which is configured to fluidize the dry powder in at least a portion of the conduit.

Clause B32. The apparatus of any one of clauses B1 to B31, further comprising a flow conduit located between the spray device and the inlet face of the filter.

Clause B33. The apparatus of clause B32, wherein the flow conduit is empty so as to provide an unimpeded flow path between the spray device and the inlet face of the filter.

Clause B34. The apparatus of clause B32, wherein the flow conduit comprises a flow conditioner interposed between the spray device and the inlet face of the filter, the flow conditioner acting to promote dispersion of the dry powder within the gas flow.

Clause B35. The apparatus of clause B34, wherein the flow conditioner comprises one or more of a static mixer, a mesh, a sieve, a baffle, and an orificed plate.

Clause B36. The apparatus of any one of clauses B1 to B35, wherein the inlet face of the filter is located from 10 to 80 cm, preferably 15 to 20 cm from the spray device, and or the spray device is located at a distance from the inlet face of the filter that is up to 4 times a diameter of the inlet face of the filter.

Clause B37. The apparatus of any one of clauses B1 to B36, further comprising a dosing device for dosing the dry powder from the reservoir.

Clause B38. The apparatus of clause B37, wherein the dosing device is configured to dose by one or more of by weight, by volume, by particle number, by time.

Clause B39. The apparatus of clause B37 or clause B38, wherein the dosing device is a gravimetric dosing device.

Clause B40. The apparatus of any one of clauses B37 to B39, wherein the dosing device is a loss in weight feeder.

Clause B41. The apparatus of any one of clauses B1 to B40, wherein the reservoir comprises one or more hoppers.

Clause B42. The apparatus of any one of clauses B1 to B41, wherein the filter is located in the holder in a vertical orientation with the inlet face uppermost.

Clause B43. The apparatus of clause B42, wherein the spray device is located vertically above the inlet face; and preferably a spray direction of the spray device is co-axial with a longitudinal axis of the filter; and preferably the spray direction and the longitudinal axis are coincident.

Clause C1. A treated filter obtainable by the method of any one of clauses A1 to A58.

Clause C2. The treated filter of clause C1 which is one or more of a catalysed soot filter (CSF), a selective catalytic reduction filter (SCRF), a lean NOx trap filter (LNTF), and a gasoline particulate filter (GPF).

Clause D1. A vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure;

the vehicular exhaust filter being loaded with a refractory powder having a tapped density before loading of less than 0.10 g/cm$^3$;

the vehicular exhaust filter having a mass loading of the refractory powder of less than 10 g/l; and wherein greater than 40% of the refractory powder is located within the porous structure of the plurality of filter walls and less than 60% of the refractory powder is coated on an external surface of the plurality of filter walls.

Clause D2. The vehicular exhaust filter of clause D1, wherein greater than 50% of the refractory powder, optionally greater than 65% of the refractory powder, optionally greater than 75% of the refractory powder, optionally up to 100% of the refractory powder is located within the porous structure of the plurality of filter walls.

Clause D3. The vehicular exhaust filter of clause D1 or clause D2, wherein the percentage of the refractory powder located within the porous structure of the plurality of filter walls is calculated by the formula:

$$\% \text{ Powder}_{in\ wall} = \left(1 - \left(\frac{[\text{Envelope volume}_{powder\ coated}\ (\text{ml}) - \text{Envelope volume}_{bare}\ (\text{ml})].\text{Bulk density (g.ml}^{-1})}{\text{Powder loading of filter (g)}}\right)\right).100\%.$$

Clause D4. The vehicular exhaust filter of any one of clauses D1 to D3, wherein the refractory powder has a tapped density before loading of less than 0.08 g/cm$^3$, optionally less than 0.07 g/cm$^3$, optionally less than 0.06 g/cm$^3$, optionally less than 0.05 g/cm$^3$.

Clause D5. The vehicular exhaust filter of any one of clauses D1 to D4, wherein the mass loading of the refractory powder is less than 7 g/l, optionally less than 5 g/l, optionally less than 3 g/l, optionally less than 1 g/l.

Clause D6. The vehicular exhaust filter of any one of clauses D1 to D5, wherein greater than 0.5 g/l of the refractory powder is located within the porous structure of the plurality of filter walls.

Clause E1. A vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure;

the vehicular exhaust filter being loaded with a refractory powder having a tapped density before loading of less than 0.10 g/cm$^3$;

the vehicular exhaust filter having a mass loading of the refractory powder of less than 10 g/l; and wherein greater than 0.5 g/l of the refractory powder is located within the porous structure of the plurality of filter walls.

Clause E2. The vehicular exhaust filter of clause E1, wherein the refractory powder has a tapped density before loading of less than 0.08 g/cm$^3$, optionally less than 0.07 g/cm$^3$, optionally less than 0.06 g/cm$^3$, optionally less than 0.05 g/cm$^3$.

Clause E3. The vehicular exhaust filter of clause E1 or clause E2, wherein the mass loading of the refractory powder is greater than 1 g/l, optionally greater than 3 g/l, optionally greater than 5 g/l, optionally greater than 7 g/l.

Clause F1. The vehicular exhaust filter of any one of clauses D1 to D6 or E1 to E3, wherein the refractory powder comprises one or more fumed refractory powders and or one or more aerogels.

Clause F2. The vehicular exhaust filter of clause F1, wherein the one or more fumed refractory powders comprises one or more of fumed alumina, fumed silica, fumed titania, other fumed metal oxide and fumed mixed oxides.

Clause F3. The vehicular exhaust filter of clause F1, wherein the one or more aerogels comprises one or more of silica aerogel, alumina aerogel, carbon aerogel, titania aerogel, zirconia aerogel, ceria aerogel, a metal oxide aerogel and mixed oxide aerogels.

Clause G1. A vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure;

the vehicular exhaust filter being loaded with a refractory powder having a tapped density before loading of less than 0.10 g/cm$^3$;

wherein the refractory powder comprises one or more aerogels.

Clause G2. The vehicular exhaust filter of clause G1, wherein the one or more aerogels comprises one or more of silica aerogel, alumina aerogel, carbon aerogel, titania aerogel, zirconia aerogel, ceria aerogel, a metal oxide aerogel and mixed oxide aerogels.

Clause H1. A vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure;

the vehicular exhaust filter being loaded with a refractory powder having a tapped density before loading of less than 0.10 g/cm$^3$;

the vehicular exhaust filter having a mass loading of the refractory powder of less than 10 g/l; and wherein the vehicular exhaust filter exhibits a substantially straight loading-back pressure response for soot loadings greater than 0.1 g/l, preferably for soot loadings greater than 0.05 g/l.

Clause J1. The vehicular exhaust filter of any one of clauses D1 to D6, or E1 to E3, or F1 to F3, or G1 to G2, of H1 having a filtration efficiency at 0.02 g/l soot loading of greater than 90%, preferably greater than 95%, preferably greater than 98%, preferably greater than 99%.

Clause J2. The vehicular exhaust filter of any one of clauses D1 to D6, or E1 to E3, or F1 to F3, or G1 to G2, or H1, or J1 having a back pressure of 20-180 mbar at a flowrate of 600 m$^3$/hr.

Clause J3. The vehicular exhaust filter of any one of clauses D1 to D6, or E1 to E3, or F1 to F3, or G1 to G2, or H1, or J1 to J2, wherein the refractory powder is an aerosol-deposited refractory powder, preferably an aerosol-deposited dry refractory powder.

Clause J4. The vehicular exhaust filter of any one of clauses D1 to D6, or E1 to E3, or F1 to F3, or G1 to G2, or H1, or J1 to J3, wherein the refractory powder has a d50 (by volume) less than 25 microns, preferably less than 20 microns, more preferably less than 10 microns.

Clause J5. The vehicular exhaust filter of any one of clauses D1 to D6, or E1 to E3, or F1 to F3, or G1 to G2, or H1, or J1 to J4, being a wall-flow filter.

Clause J6. The vehicular exhaust filter of any one of clauses D1 to D6, or E1 to E3, or F1 to F3, or G1 to G2, or H1, or J1 to J5, wherein the vehicular exhaust filter is a calcined filter.

Clause J7. The vehicular exhaust filter of any one of clauses D1 to D6, or E1 to E3, or F1 to F3, or G1 to G2, or H1, or J1 to J6 wherein the porous substrate comprises one or more washcoats.

Clause J8. The vehicular exhaust filter of any one of clauses D1 to D6, or E1 to E3, or F1 to F3, or G1 to G2, or H1, or J1 to J7, wherein the porous substrate comprises an adhesion promoter and or binder.

Clause J9. An exhaust system comprising the vehicular exhaust filter of any one of clauses D1 to D6, or E1 to E3, or F1 to F3, or G1 to G2, or H1, or J1 to J8.

Clause J10. A vehicle comprising the vehicular exhaust filter of anyone of clauses D1 to D6, or E1 to E3, or F1 to F3, or G1 to G2, or H1, or J1 to J8.

Clause K1. A plurality of vehicular exhaust filters, each vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure;

each vehicular exhaust filter being loaded with a refractory powder having a tapped density before loading of less than 0.10 g/cm$^3$; and each vehicular exhaust filter having a mass loading of the refractory powder of less than 10 g/l;

wherein each vehicular exhaust filter has a back pressure of 20-180 mbar at a flowrate of 600 m$^3$/hr and the relative standard deviation of the back pressure of the plurality of vehicular exhaust filters is less than 0.04, preferably less than 0.025.

Clause K2. The plurality of vehicular exhaust filters of clause K1, wherein for each vehicular exhaust filter greater than 40% of the refractory powder is located within the porous structure of the plurality of filter walls and less than 60% of the refractory powder is coated on an external surface of the plurality of filter walls.

Clause K3. The plurality of vehicular exhaust filters of clause K1 or clause K2, wherein the refractory powder is an aerosol-deposited refractory powder, preferably an aerosol-deposited dry refractory powder.

The invention claimed is:

1. A method for treating a filter for filtering particulate matter from exhaust gas, the method comprising the steps of:

a) containing a dry powder in a reservoir;

b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;

d) transferring the dry powder from the reservoir to a spray device located upstream of the inlet face of the filter; and e) spraying the dry powder, using the spray device, towards the inlet face of the filter such that the dry powder is entrained in the primary gas flow and passes through the inlet face of the filter to contact the porous structure;

wherein the method further comprises monitoring a back pressure of the filter during at least step e) and stopping the spraying of the dry powder towards the inlet face of the filter when a pre-determined back pressure of the filter is reached.

2. The method of claim 1, wherein the transfer of the dry powder from the reservoir to the spray device is controllable independently of establishing and controlling the primary gas flow; and optionally wherein the spraying of the dry powder towards the inlet face of the filter is controllable independently of establishing and controlling the primary gas flow.

3. The method of claim 1, wherein the primary gas flow is established before the dry powder is transferred to the spray device and sprayed towards the inlet face.

4. The method of claim 1, wherein in step d) a secondary gas flow, separate to the primary gas flow, is used to transfer the dry powder from the reservoir to the spray device.

5. The method of claim 4, wherein the secondary gas flow comprises a flow of compressed air.

6. The method of claim 1, comprising using a vacuum generator to establish the primary gas flow through the porous structure of the filter.

7. The method of claim 6, wherein a level of the pressure reduction generated by the vacuum generator is controllable independently of a speed or mass rate of the transfer of the dry powder from the reservoir to the spray device.

8. The method of claim 1, wherein the pre-determined back pressure is an absolute back pressure.

9. The method of claim 1, further comprising monitoring a back pressure of the filter during at least step c) and step e).

10. The method of claim 9, wherein the pre-determined back pressure is a relative back pressure.

11. The method of claim 9, wherein a first back pressure of the filter is measured in step c) before the dry powder is deposited in the porous structure and a second back pressure of the filter is measured in step e) during deposition of the dry powder in the porous structure, wherein the spraying of the dry powder is stopped when the second back pressure reaches a predetermined percentage of the first back pressure.

12. The method of claim 1, further comprising in step d) dosing the dry powder from the reservoir.

13. The method of claim 1, further comprising monitoring a back pressure of the filter during at least steps c), d) and e).

* * * * *